(12) United States Patent
Shin

(10) Patent No.: US 12,158,999 B2
(45) Date of Patent: Dec. 3, 2024

(54) DISPLAY DEVICE AND TOUCH INPUT SYSTEM INCLUDING THE SAME

(71) Applicant: SAMSUNG DISPLAY CO., LTD., Yongin-si (KR)

(72) Inventor: Kyu Shik Shin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/116,396

(22) Filed: Mar. 2, 2023

(65) Prior Publication Data

US 2024/0028148 A1  Jan. 25, 2024

(30) Foreign Application Priority Data

Jul. 22, 2022 (KR) .................... 10-2022-0090899

(51) Int. Cl.
| | | |
|---|---|---|
| *G06F 3/041* | (2006.01) | |
| *G06F 3/03* | (2006.01) | |
| *G06F 3/0354* | (2013.01) | |
| *G06K 19/06* | (2006.01) | |
| *G06V 10/10* | (2022.01) | |

(52) U.S. Cl.
CPC .......... *G06F 3/0412* (2013.01); *G06F 3/0317* (2013.01); *G06F 3/0321* (2013.01); *G06F 3/041* (2013.01); *G06F 3/0325* (2013.01); *G06F 3/03542* (2013.01); *G06F 3/03545* (2013.01); *G06K 19/06037* (2013.01); *G06V 10/19* (2022.01)

(58) Field of Classification Search
CPC .... G06F 3/0412; G06F 3/0317; G06F 3/0321; G06F 3/0325; G06F 3/03542; G06F 3/03545; G06F 3/041; G06F 3/0446; G06F 3/0416; G06F 3/046; G06K 19/06037; G06V 10/19; G02F 1/13338; H10K 50/844; H10K 59/40
See application file for complete search history.

(56) References Cited

U.S. PATENT DOCUMENTS

| | | | |
|---|---|---|---|
| 6,929,183 | B2 | 8/2005 | Pettersson |
| 7,248,250 | B2 | 7/2007 | Pettersson et al. |
| 7,281,668 | B2 | 10/2007 | Pettersson et al. |
| 7,588,191 | B2 | 9/2009 | Pettersson et al. |
| 7,999,798 | B2 * | 8/2011 | Pettersson ........ G06K 19/06037 345/179 |
| 10,627,967 | B2 * | 4/2020 | Kim ..................... G06F 3/0446 |
| 2003/0061188 | A1 * | 3/2003 | Wiebe ..................... G06F 16/20 |

(Continued)

FOREIGN PATENT DOCUMENTS

| | | |
|---|---|---|
| KR | 10-1026580 | 4/2011 |
| KR | 10-2013-0139225 | 12/2013 |

*Primary Examiner* — Mihir K Rayan
(74) *Attorney, Agent, or Firm* — F. CHAU & ASSOCIATES, LLC

(57) ABSTRACT

A display device includes: a display unit including a plurality of light emission areas; a plurality of touch electrodes disposed between the plurality of light emission areas to sense a touch; and a plurality of code patterns formed between the plurality of light emission areas in a predetermined planar code shape, wherein code patterns, which indicate preset direction designated position codes, are repeatedly disposed in an outermost area in at least one direction of a touch sensor area in which the plurality of touch electrodes are arranged.

20 Claims, 21 Drawing Sheets

(56) References Cited

U.S. PATENT DOCUMENTS

| | | | |
|---|---|---|---|
| 2008/0036926 A1* | 2/2008 | Chen | G02F 1/13338 349/1 |
| 2010/0225664 A1* | 9/2010 | Ogasawara | G09G 5/34 345/660 |
| 2013/0321357 A1* | 12/2013 | Yamada | G06F 3/0386 345/179 |
| 2015/0035811 A1* | 2/2015 | Yamada | G06F 3/0321 345/179 |

* cited by examiner

FIG. 11
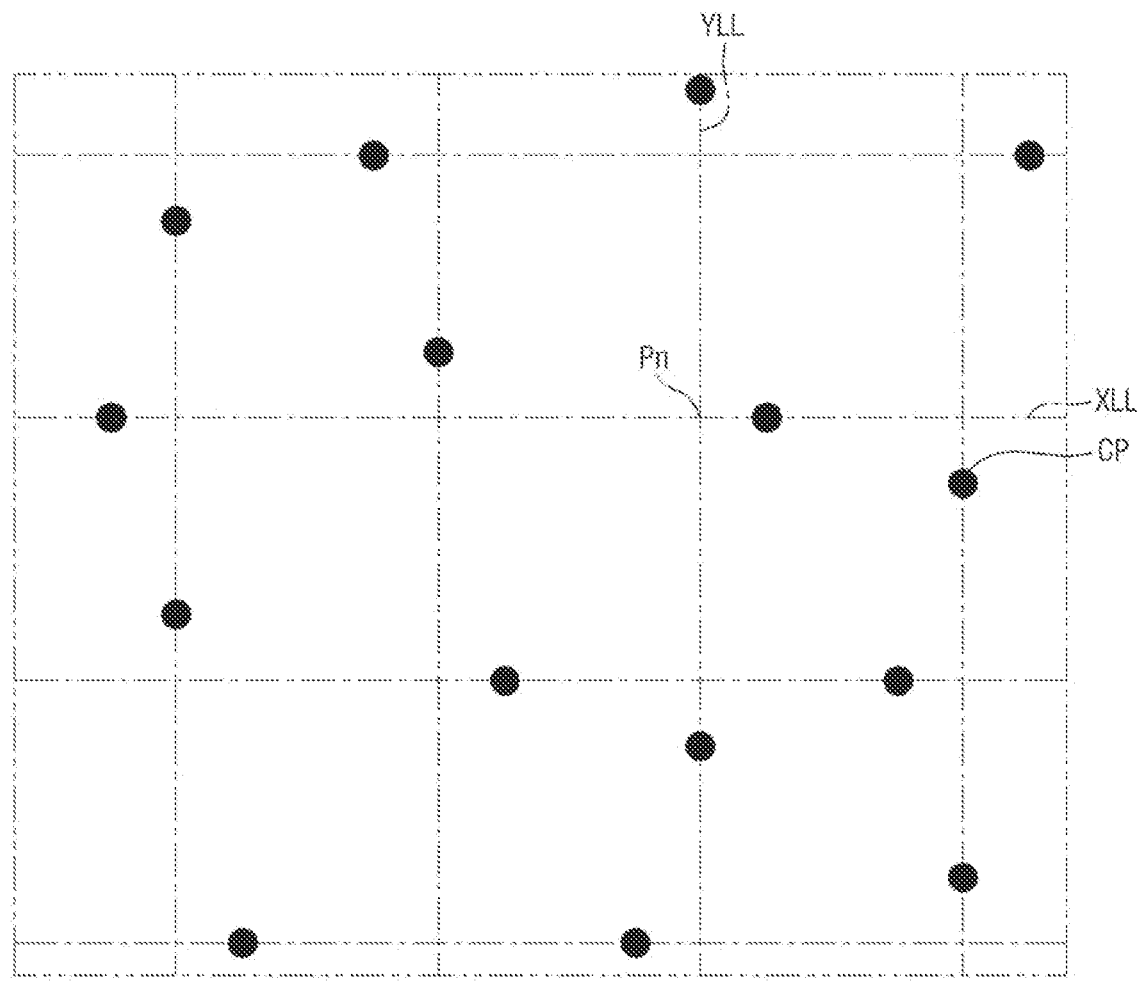
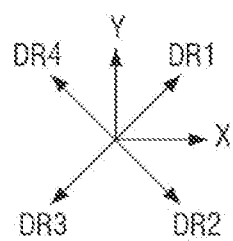

FIG. 13
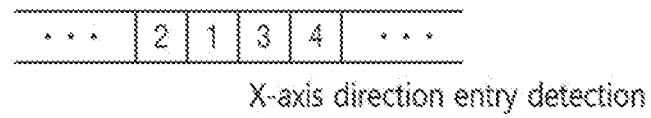
X-axis direction entry detection
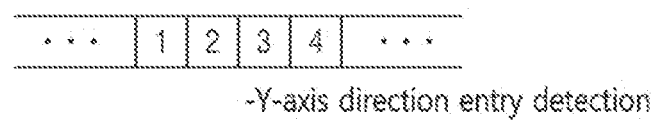
-Y-axis direction entry detection
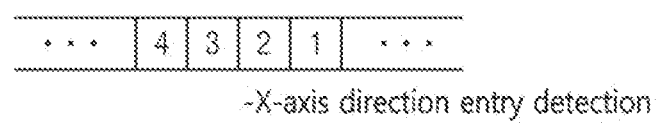
-X-axis direction entry detection
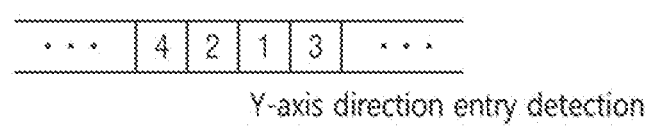
Y-axis direction entry detection FIG. 15
PSD1
| ... | 2 | 1 | 3 | 4 | ... |
X-axis direction entry detection
| ... | 1 | 2 | 2 | 1 | ... |
| ... | 1 | 1 | 1 | 2 | ... |
Y-axis direction entry detection
PSD2
| ... | 1 | 2 | 3 | 4 | ... |
-Y-axis direction entry detection
| ... | 2 | 2 | 2 | 1 | ... |
| ... | 2 | 1 | 3 | 3 | ... |
X-axis direction entry detection

FIG. 17

| ... | 1 | 2 | 4 | 0 | ... |

X-axis direction entry detection

| ... | 1 | 4 | 2 | 0 | ... |

-Y-axis direction entry detection

| ... | 1 | 2 | 3 | 0 | ... |

-X-axis direction entry detection

| ... | 1 | 3 | 4 | 0 | ... |

Y-axis direction entry detection

FIG. 18
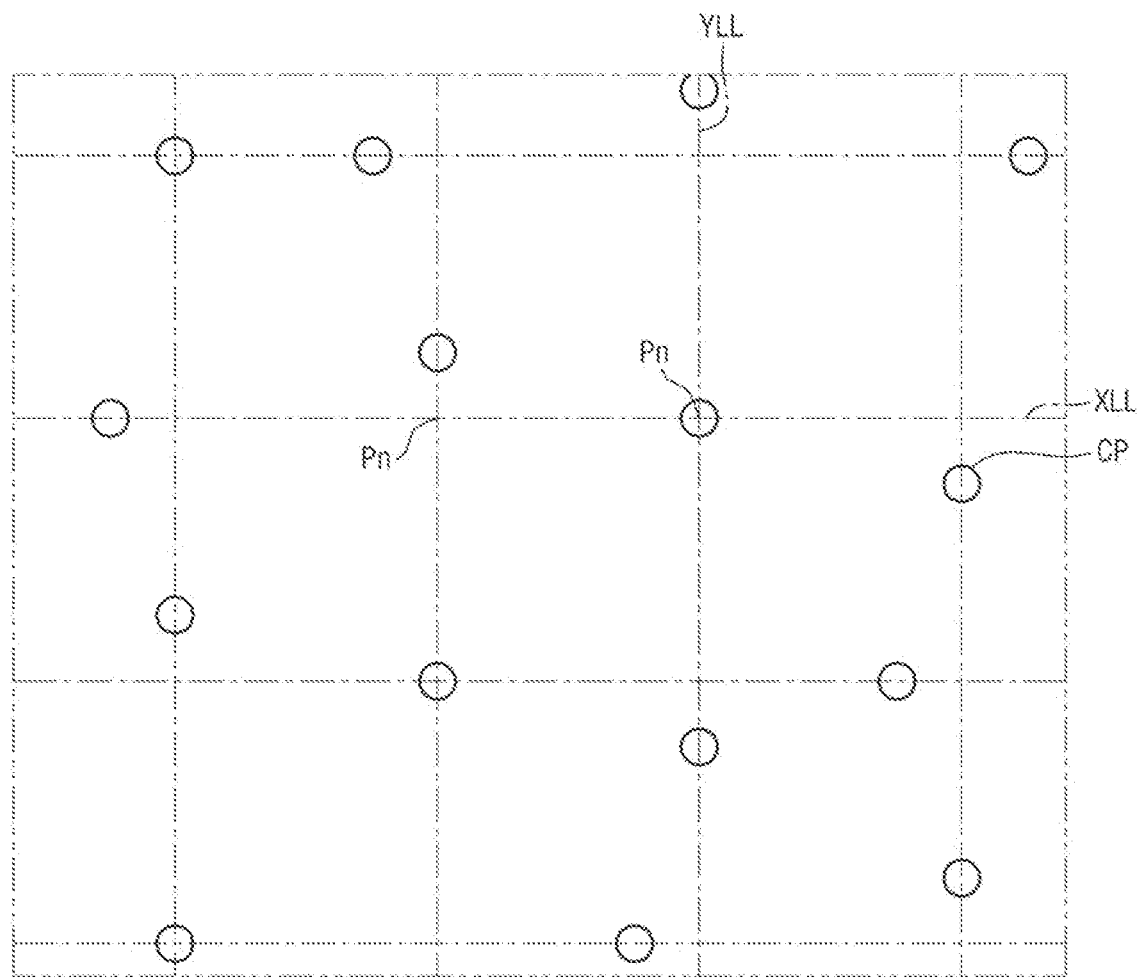
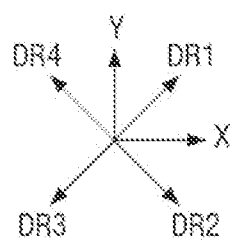

DISPLAY DEVICE AND TOUCH INPUT SYSTEM INCLUDING THE SAME

CROSS-REFERENCE TO RELATED APPLICATION

This application claims priority under 35 U.S.C. § 119 to Korean Patent Application No. 10-2022-0090899 filed on Jul. 22, 2022 in the Korean Intellectual Property Office, the disclosure of which is incorporated by reference herein in its entirety.

TECHNICAL FIELD

The present invention relates to a display device and a touch input system including the same.

DISCUSSION OF THE RELATED ART

With the advancement of the information age, the demand for a display device for displaying an image has increased and has been implemented in various ways. For example, the display device has been applied to various electronic devices such as a smart phone, a digital camera, a laptop computer, a navigator and a smart television. The display device may be a flat panel display device such as a liquid crystal display device, a field emission display device and an organic light emitting display device. Among the flat panel display devices, the light emitting display device includes a light emitting element in which each of pixels of a display panel may self-emit light, thereby displaying an image without the use of a backlight unit to provide the display panel with light.

Generally, a recent display device supports a touch input using a portion (e.g., finger) of a user's body and a touch input using a touch object, such as an electronic pen. The display device may more precisely sense a touch input when an electronic pen is being used when compared to when only a portion of the user's body is being used for a touch input.

SUMMARY

Aspects of the present invention provide a display device capable of performing a touch input of a touch input device more accurately by using code patterns formed at edge areas of a display panel, and a touch input system including the same.

Aspects of the present invention are not limited to those mentioned above and additional aspects of the present invention, which are not mentioned herein, will be clearly understood by those skilled in the art from the following description of the present invention.

According to an embodiment of the present invention, a display device includes: a display unit including a plurality of light emission areas; a plurality of touch electrodes disposed between the plurality of light emission areas to sense a touch; and a plurality of code patterns formed between the plurality of light emission areas in a predetermined planar code shape, wherein code patterns, which indicate preset direction designated position codes, are repeatedly disposed in an outermost area in at least one direction of a touch sensor area in which the plurality of touch electrodes are arranged.

According to an embodiment of the present invention, a touch input system includes: a display device displaying an image; and a touch input device inputting a touch to the display device, wherein the display device includes: a display unit including a plurality of light emission areas; a plurality of touch electrodes disposed between the plurality of light emission areas to sense a touch; and a plurality of code patterns formed between the plurality of light emission areas in a predetermined planar code shape, wherein code patterns, which indicate preset direction designated position codes, are repeatedly disposed in an outermost area in at least one direction of a touch sensor area in which the plurality of touch electrodes are arranged.

BRIEF DESCRIPTION OF THE DRAWINGS

The above and other features of the present invention will become more apparent by describing in detail embodiments thereof with reference to the attached drawings, in which:

FIG. 11 is a view illustrating a method of analyzing a code pattern position of a code processor of a touch input device shown in FIGS. 1 and 2;

FIG. 13 is a view illustrating a method of recognizing position codes detected by a touch input device and a detected position;

FIG. 15 is view illustrating a method of recognizing position codes detected by a touch input device and a detected position;

FIG. 17 is view illustrating a method of recognizing position codes detected by a touch input device and a detected position;

FIG. 18 is a view illustrating a method of analyzing a code pattern position of a code processor of a touch input device according to an embodiment of the present invention;

DETAILED DESCRIPTION OF THE EMBODIMENTS

Embodiments of present invention will now be described more fully hereinafter with reference to the accompanying drawings. This invention may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present invention will be described with reference to the accompanying drawings.

Figure 1:
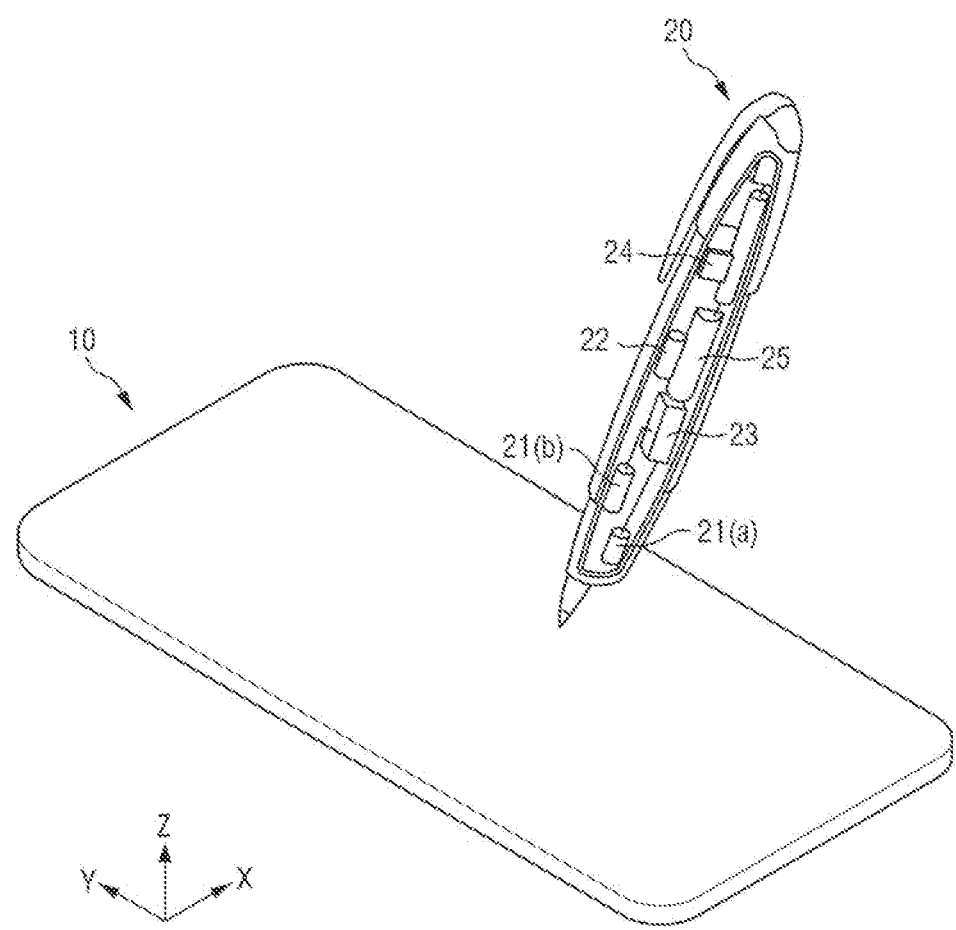
FIG. 1 is a schematic view illustrating a touch input system according to an embodiment of the present invention.
Figure 2:
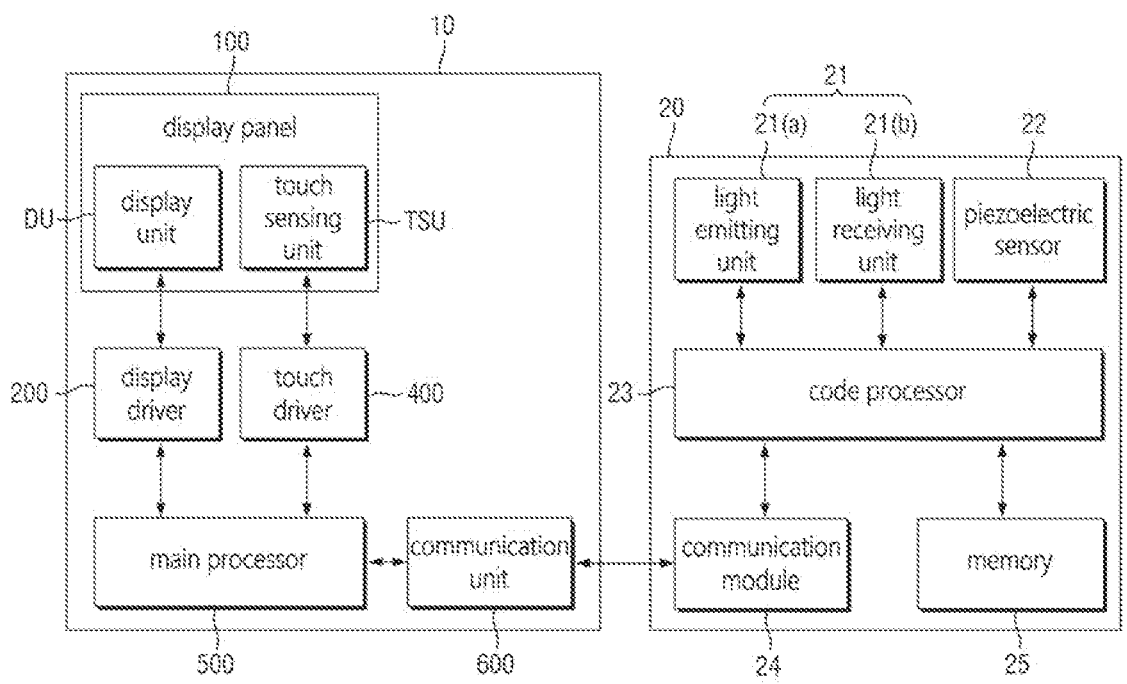
FIG. 2 is a detailed schematic block view illustrating a touch input device and a display device, which are shown in FIG. 1.

FIG. 1 is a schematic view illustrating a touch input system according to an embodiment of the present invention. FIG. 2 is a detailed schematic block view illustrating a touch input device and a display device, which are shown in FIG. 1.

Referring to FIGS. 1 and 2, the display device 10 may be applied to a portable electronic device such as a mobile phone, a smart phone, a tablet personal computer (PC), a mobile communication terminal, an electronic diary, an electronic book, a portable multimedia player (PMP), a navigator, and an ultra mobile PC (UMPC). For example, the display device 10 may be applied to a television, a laptop computer, a monitor, a signboard, or a display unit of Internet of things (IoT). For another example, the display device 10 may be applied to a wearable device such as a smart watch, a watch phone, an eyeglasses-type display and a head mounted display (HMD).

The display device 10 includes a display panel 100, a display driver 200, a touch driver 400, a main processor 500, and a communication unit 600.

The display device 10 uses a touch input device 20 as a touch input mechanism. The display panel 100 of the display device 10 may include a display unit DU for displaying an image. The display device 10 may include a touch sensing unit TSU for sensing a touch of a human body such as a finger, the touch input device 20, etc.

The display unit DU of the display panel 100 may include a plurality of pixels, and may display an image through the plurality of pixels. The touch sensing unit TSU of the display panel 100 may be formed on a front surface of the display panel 100.

The touch sensing unit TSU may include a plurality of touch electrodes, and may sense a touch of a user in a capacitance manner. The touch sensing unit TSU may include a plurality of code patterns patterned on a front insulating layer of a portion of the plurality of touch electrodes or formed on a transparent film on a front surface of the touch sensing unit TSU. The code patterns of the touch sensing unit TSU are sensed by the touch input device 20 when infrared light reflection is sensed by the touch input device 20.

For example, the code patterns may be formed and disposed in a non-light emission area that is an area between the respective pixels so as not to overlap a light emission area of each of the pixels. Therefore, each of the code patterns may be formed and disposed at a predetermined interval on a portion of a front surface of some of the plurality of touch electrodes in the form of a predetermined planar code. For example, the code patterns of the display panel 100 may be formed in a predetermined planar code shape of a predetermined area in a front direction of some of the plurality of touch electrodes. The code patterns may be formed of a light shielding member (or light absorbing member), or may be formed of a reflective member including a metal material. The code patterns are sensed by the touch input device 20 depending on a planar code shape of the light shielding member or the reflective member, a size of the planar code, and the like.

In addition, the code patterns may be formed on the front surface of some touch electrodes in a planar code shape of a predetermined area, or may be formed on the front insulating layer of the touch electrodes in a planar code shape of a predetermined area. Unlike this case, the code patterns may be formed on a separate transparent film, and thus may be disposed on the front surface of the touch sensing unit TSU together with the transparent film. In this case, the code patterns may be formed and disposed on a transparent film corresponding to the arrangement position of some touch electrodes. A formation structure of the code patterns disposed on an upper or front surface of the touch sensing unit TSU may be applied and used in various structures, and is not limited to any one embodiment. Hereinafter, an example in which the code patterns are formed on the front insulating layer of the touch electrodes at the same or different intervals will be described, and a detailed arrangement and an arrangement structure of the code patterns will be described in more detail later with reference to the accompanying drawings.

The touch sensing unit TSU may further include a plurality of grid patterns formed of the same material as that of the plurality of touch electrodes through the same process as that of the plurality of touch electrodes when the plurality of touch electrodes are formed. The grid patterns are patterns that become grid reference points of a plurality of grid reference lines when the grid reference lines are formed to calculate position coordinates in the touch input device 20, and may be integrally formed with the plurality of touch electrodes or may be formed separately from the plurality of touch electrodes. For example, the grid patterns may be formed at a predetermined grid reference point position to form the plurality of grid reference lines. The grid patterns may be formed at each grid reference point position in a shape protruded from the plurality of touch electrodes in at least one direction. In addition, the grid patterns may be separated from the touch electrodes at each reference point position, and thus may be formed in a shape having an area of a predetermined circular, oval or polygonal shape. A width or area of each grid pattern in at least one of horizontal, vertical, or diagonal direction may be wider than a width of each touch electrode on a plane. Therefore, light reflectance of each grid pattern may be higher than that of the peripheral touch electrodes.

The display driver 200 may output signals and voltages for driving the display unit DU. The display driver 200 may supply data voltages to data lines. The display driver 200 may supply a power voltage to a power line and supply gate control signals to a gate driver.

The touch driver 400 may be connected to the touch sensing unit TSU. The touch driver 400 may supply a touch driving signal to the plurality of touch electrodes of the touch sensing unit TSU, and may sense a change in capacitance between the plurality of touch electrodes. The touch driver 400 may calculate a touch input and touch coordinates of a user based on the change amount of capacitance between the plurality of touch electrodes.

The main processor 500 may control all functions of the display device 10. For example, the main processor 500 may supply digital video data to the display driver 200 so that the display panel 100 displays an image. For example, the main processor 500 may receive touch data from the touch driver 400 to determine the touch coordinates of the user, and then may generate digital video data based on the touch coordinates or execute applications indicated by icons displayed on the touch coordinates of the user. For another example, the main processor 500 receives coordinate data from the touch input device 20 to determine touch coordinates of the touch input device 20. Then, the main processor 500 may generate digital video data based on the received touch coordinates, or may execute applications indicated by icons displayed on the touch coordinates of the touch input device 20.

The communication unit 600 may perform wired/wireless communication with an external device. For example, the communication unit 600 may transmit and receive a communication signal to and from a communication module 24 of the touch input device 20. The communication unit 600 may receive coordinate data comprised of data codes from the touch input device 20, and may provide the coordinate data to the main processor 500.

The touch input device 20 is used as a touch input mechanism, and may be configured as an electronic pen such as a stylus pen or a smart pen. The touch input device 20 is an electronic pen that senses display light of the display panel 100 or light reflected from the display panel 100 by using an optical method, and may detect code patterns included in the display panel 100 based on the sensed light and generate coordinate data. The touch input device 20 may be an electronic pen having a writing instrument shape, but the present invention is not limited to such writing instrument type or structure.

The code detector 21 of the touch input device 20 is disposed at a position adjacent to a first end (e.g., a pen tip portion) of the touch input device 20 to sense code patterns included in the display panel 100. To this end, the code detector 21 includes at least one light emitting unit 21(a) for emitting infrared light by using at least one infrared light source, and at least one light receiving unit 21(b) for detecting infrared light reflected from a portion of the touch sensing unit TSU, which includes the code patterns, through an infrared camera.

At least one infrared light source included in the light emitting unit 21(a) may be comprised of an infrared LED array with a matrix structure. The infrared camera of the light receiving unit 21(b) may include a filter for blocking a wavelength band other than the infrared light and allowing the infrared light to pass therethrough, a lens system for focusing the infrared light passing through the filter, and an optical image sensor for converting an optical image formed by the lens system into an electrical image signal and outputting the image signal. The optical image sensor may be comprised of an array of a matrix structure in the same manner as the infrared LED array to provide shape data of the code patterns to the code processor 23 in accordance with a shape of light reflected from the code patterns and the amount of reflected light. For example, when the grid patterns and the code patterns are all formed in the touch sensing unit TSU, the optical image sensor may provide shape data of the code patterns to the code processor 23 in accordance with the shape of light reflected from the grid patterns and the code patterns and the amount of reflected light. In this way, the code detector 21 of the touch input device 20 may continuously detect the code patterns in accordance with the control and movement of the user, and may continuously generate the shape data of the code patterns to provide the shape data to the code processor 23.

The code processor 23 may continuously receive the shape data of the code patterns from the code detector 21. The code processor 23 continuously receives the shape data of the code patterns, and identifies and analyzes the arrangement structures of the grid reference lines and the code patterns to extract coordinate data. When the shape data of the grid patterns are received together with the code patterns, the grid reference lines may be formed in accordance with the arrangement positions of the grid patterns, and the arrangement structures of the grid reference lines and the code patterns may be identified and analyzed to extract coordinate data.

For example, the code processor 23 of the touch input device 20 itself forms vertical and horizontal grid reference lines, and matches and compares the vertical and horizontal grid reference lines with the arrangement position of the code patterns based on crossing points of the vertical and horizontal grid reference lines. The code processor 23 extracts touch position coordinates and coordinate data in accordance with the result of comparing the crossing points of the grid reference lines with the arrangement position of the code patterns. Unlike this case, when the shape data in which the code patterns and the grid patterns are mixed is received from the code detector 21, the code processor 23 may form vertical and horizontal grid reference lines based on the arrangement position of the grid patterns. In addition, the code processor 23 may extract touch position coordinates and coordinate data according to the result of comparing the crossing points of the grid reference lines with the arrangement position of the code patterns by matching and comparing the crossing points of the vertical and horizontal grid reference lines with the arrangement position of the code patterns.

The code processor 23 transmits coordinate data including touch position coordinates to the display device 10 through the communication module 24. As described above, the code processor 23 may generate coordinate data in real time without complex computation and correction by continuously generating touch position coordinates and coordinate data corresponding to the shape of the result of comparing the cross points of the grid reference lines with the arrangement position of the code patterns.

The communication module 24 may perform wired/wireless communication with an external device. For example, the communication module 24 may transmit and receive a communication signal to and from the communication unit 600 of the display device 10. The communication module 24 may receive coordinate data including touch position coordinates from the code processor 23 and provide the coordinate data to the communication unit 600.

The memory 25 may store data used for driving the touch input device 20. Shape image or shape data from the result of comparing the crossing points of the grid reference lines with the arrangement position of the code patterns, and touch position coordinates and coordinate data corresponding to the shape image or the shape data are stored in the memory 25. The memory 25 shares the shape image or the shape data from the result of comparing the crossing points of the grid reference lines with the arrangement position of the code patterns, and touch position coordinates and coordinate data corresponding to the shape image or the shape data with the code processor 23. Therefore, the code processor 23 matches and compares the crossing points of the grid reference lines with the arrangement position of the code patterns. The processor 23 may compare the compared result with the shape image or the shape data from the result of comparing the arrangement position, which is stored in the memory 25, thereby extracting the touch position coordinates and the coordinate data according to the comparison result.

Figure 3:
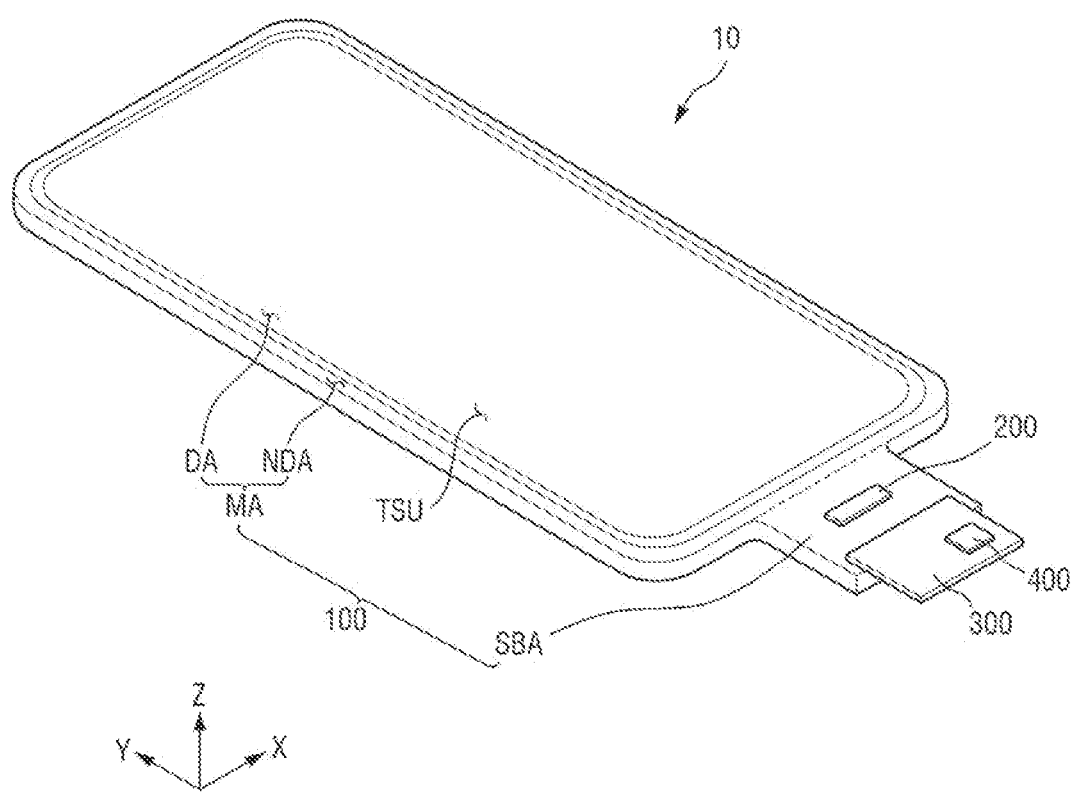
FIG. 3 is a detailed perspective view illustrating a configuration of the display device shown in FIG. 2.
Figure 4:
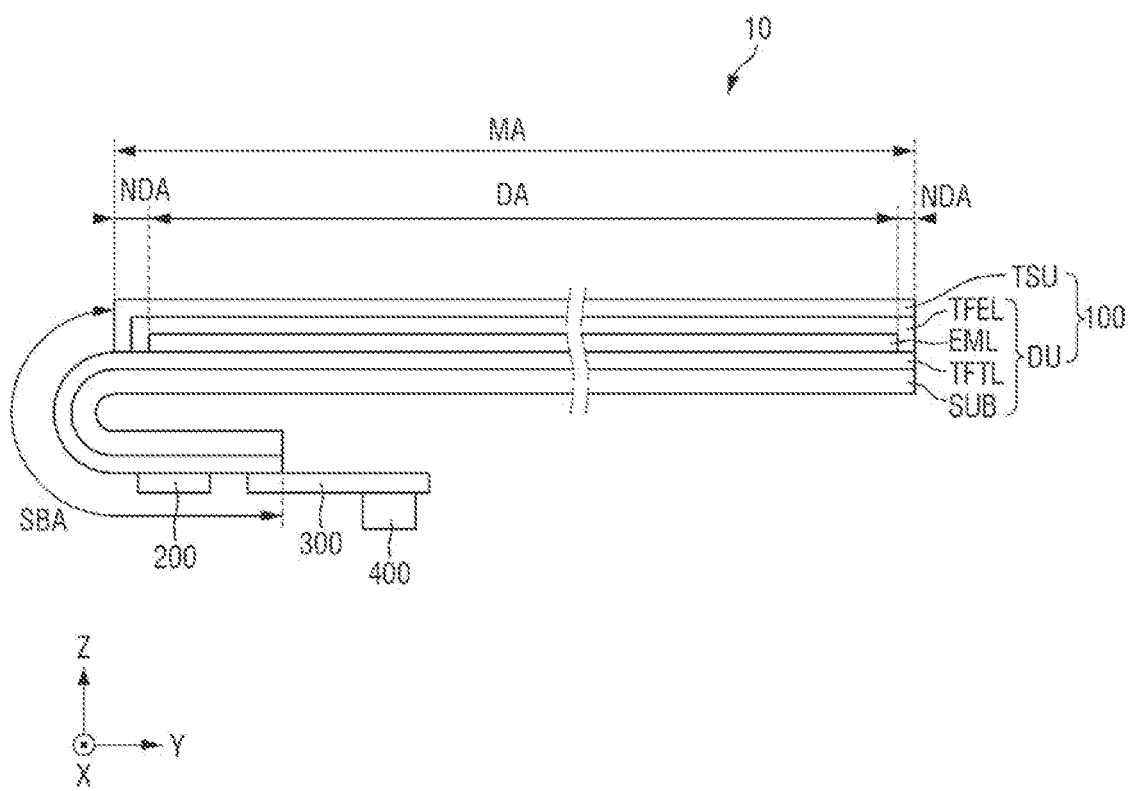
FIG. 4 is a detailed cross-sectional view illustrating a configuration of the display device shown in FIG. 3.

FIG. 3 is a detailed perspective view illustrating a configuration of the display device shown in FIG. 2. FIG. 4 is a detailed cross-sectional view illustrating a configuration of the display device shown in FIG. 3.

Referring to FIGS. 3 and 4, the display device 10 may have a planar shape similar to a rectangular shape. For example, the display device 10 may have a planar shape similar to a rectangular shape having a short side in X-axis direction and a long side in Y-axis direction. For example, a corner where the short side in the X-axis direction and the long side in the Y-axis direction meet may be rounded to have a predetermined curvature or formed at right angles. The planar shape of the display device 10 is not limited to the rectangular shape, and may be formed similarly to other polygonal shapes, a circular shape or an oval shape.

The display panel 100 may include a main area MA and a sub-area SBA.

The main area MA includes a display area DA having pixels for displaying an image, and a non-display area NDA disposed near or adjacent to the display area DA. The display area DA may emit light from a plurality of light emission areas and a plurality of opening areas. For example, the display panel 100 may include a pixel circuit including switching elements, a pixel defining layer defining a light emission area or an opening area, and a self-light emitting element.

The non-display area NDA may be an outer area of the display area DA. The non-display area NDA may be defined as an edge area of the main area MA of the display panel 100. For example, non-display area NDA may at least partially surround the display area DA. The non-display area NDA may include a gate driver for supplying gate signals to gate lines, and fan-out lines for connecting the display driver 200 with the display area DA.

The sub-area SBA may be extended from one side of the main area MA. The sub-area SBA may include a flexible material capable of being subjected to bending, folding, rolling and the like. For example, when the sub-area SBA is bent, the sub-area SBA may overlap the main area MA in a thickness direction (e.g., a Z-axis direction). The sub-area SBA may include a display driver 200, and a pad area connected to a circuit board 300. In addition, the sub-area SBA may be omitted, and the display driver 200 and the pad area may be disposed in the non-display area NDA.

The display driver 200 may be formed of an integrated circuit (IC), and may be packaged on the display panel 100 by a chip on glass (COG) method, a chip on plastic (COP) method or an ultrasonic bonding method. For example, the display driver 200 may be disposed in the sub-area SBA, and may overlap the main area MA in the thickness direction (e.g., the Z-axis direction) by bending of the sub-area SBA. For another example, the display driver 200 may be packaged on the circuit board 300.

The circuit board 300 may be attached onto the pad area of the display panel 100 using an anisotropic conductive film (ACF). Lead lines of the circuit board 300 may be electrically connected to the pad area of the display panel 100. The circuit board 300 may be a flexible printed circuit board, a printed circuit board, or a flexible film such as a chip on film.

The touch driver 400 may be packaged on the circuit board 300. The touch driver 400 may be formed of an integrated circuit (IC). As described above, the touch driver 400 may supply a touch driving signal to the plurality of touch electrodes of the touch sensing unit TSU, and may sense a change in capacitance between the plurality of touch electrodes. In this case, the touch driving signal may be a pulse signal having a predetermined frequency. The touch driver 400 calculates a touch input of a user's body such as finger and touch coordinates based on the change in capacitance between the plurality of touch electrodes.

Referring to FIG. 4, the display panel 100 may include a display unit DU, a touch sensing unit TSU, and a polarizing film. The display unit DU may include a substrate SUB, a thin film transistor layer TFTL, a light emitting element layer EML, and an encapsulation layer TFEL.

The substrate SUB may be a base substrate or a base member. For example, the substrate SUB may be a flexible substrate SUB capable of being subjected to bending, folding, rolling and the like. For example, the substrate SUB may include a glass material or a metal material, but the present invention is not limited thereto. For another example, the substrate SUB may include a polymer resin such as polyimide (PI).

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines for connecting the display driver 200 with the data lines, and lead lines for connecting the display driver 200 with the pad area. When the gate driver is formed on one side of the non-display area NDA of the display panel 100, the gate driver may include thin film transistors.

The thin film transistor layer TFTL may be disposed in the display area DA, the non-display area NDA, and the sub-area SBA. The thin film transistors, the gate lines, the data lines and the power lines, which are connected to respective pixels, of the thin film transistor layer TFTL may be disposed in the display area DA. The gate control lines and fan-out lines of the thin film transistor layer TFTL may be disposed in the non-display area NDA. The lead lines of the thin film transistor layer TFTL may be disposed in the sub-area SBA.

The light emitting element layer EML may be disposed on the thin film transistor layer TFTL. The light emitting element layer EML may include a plurality of light emitting elements that include a first electrode, a light emitting layer and a second electrode, which are sequentially stacked to emit light, and a pixel defining layer that pixel areas or light emitting areas. The plurality of light emitting elements of the light emitting element layer EML may be disposed in the display area DA. The light emitting layer may be an organic light emitting layer that includes an organic material. The light emitting layer may include a hole transporting layer, an organic light emitting layer, and an electron transporting layer. When the first electrode receives a predetermined voltage through the thin film transistor of the thin film transistor layer TFTL and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode electrode, and the second electrode may be a cathode electrode, but they are not limited thereto.

For another example, the plurality of light emitting elements may include a quantum dot light emitting diode including a quantum dot light emitting layer, or an inorganic light emitting diode including an inorganic semiconductor.

The encapsulation layer TFEL may cover an upper surface and sides of the light emitting element layer EML and protect the light emitting element layer EML. The encapsulation layer TFEL may include at least one inorganic layer and at least one organic layer to encapsulate the light emitting element layer EML.

The touch sensing unit TSU may be disposed on the encapsulation layer TFEL. The touch sensing unit TSU may include a plurality of touch electrodes for sensing a user's touch in a capacitance manner, and touch lines for connecting the plurality of touch electrodes with the touch driver 400. For example, the touch sensing unit TSU may sense a user's touch in a self-capacitance manner or a mutual capacitance manner.

For another example, the touch sensing unit TSU may be disposed on a separate substrate disposed on the display unit DU. In this case, the substrate for supporting the touch sensing unit TSU may be a base member for encapsulating the display unit DU.

The plurality of touch electrodes of the touch sensing unit TSU may be disposed in a touch sensor area overlapped with the display area DA. The touch lines of the touch sensing unit TSU may be disposed in a touch peripheral area overlapped with the non-display area NDA.

The sub-area SBA of the display panel 100 may be extended from one side of the main area MA. The sub-area SBA may include a flexible material capable of being subjected to bending, folding, rolling and the like. For example, when the sub-area SBA is bent, the sub-area SBA may overlap the main area MA in the thickness direction (e.g., the Z-axis direction). The sub-area SBA may include a display driver 200 and a pad area connected to the circuit board 300.

Figure 5:
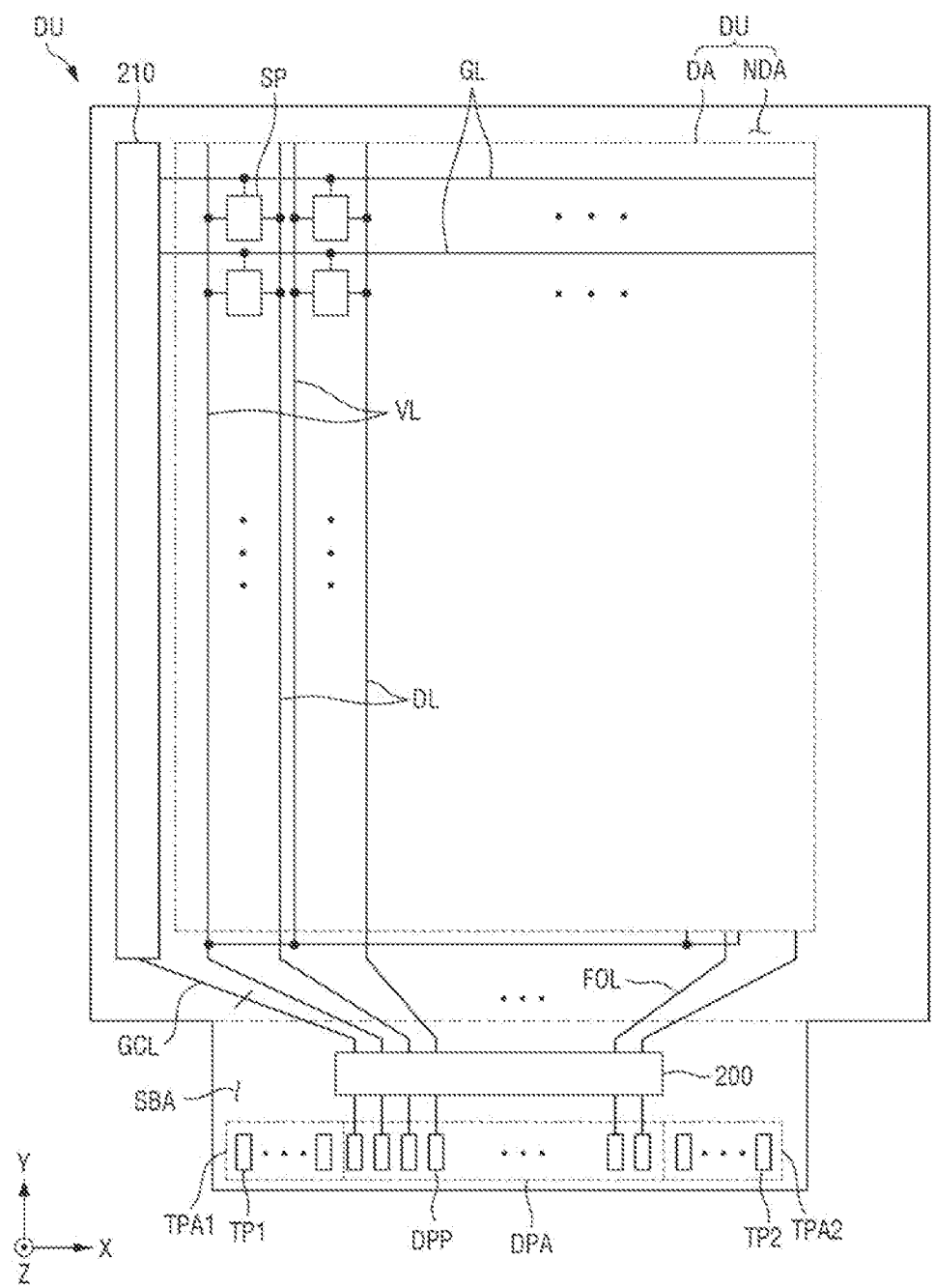
FIG. 5 is a plan view illustrating a display unit of a display device according to an embodiment of the present invention.

FIG. 5 is a plan view illustrating a display unit of a display device according to an embodiment of the present invention.

Referring to FIG. 5, the display area DA of the display unit DU is an area for displaying an image, and may be a central area of the display panel 100. The display area DA may include a plurality of pixels SP, a plurality of gate lines GL, a plurality of data lines DL, and a plurality of power lines VL. Each of the plurality of pixels SP may be a minimum unit for outputting light.

The plurality of gate lines GL may supply the gate signals received from the gate driver 210 to the plurality of pixels SP. The plurality of gate lines GL may be extended in the X-axis direction, and may be spaced apart from each other in the Y-axis direction crossing the X-axis direction.

The plurality of data lines DL may supply the data voltages received from the display driver 200 to the plurality of pixels SP. The plurality of data lines DL may be extended in the Y-axis direction, and may be spaced apart from each other in the X-axis direction.

The plurality of power lines VL may supply the power voltage received from the display driver 200 to the plurality of pixels SP. The power voltage may be at least one of a driving voltage, an initialization voltage or a reference voltage. The plurality of power lines VL may be extended in the Y-axis direction, and may be spaced apart from each other in the X-axis direction.

The non-display area NDA of the display unit DU may at least partially surround the display area DA. The non-display area NDA may include a gate driver 210, fan-out lines FOL, and gate control lines GCL. The gate driver 210 may generate a plurality of gate signals based on the gate control signals, and may sequentially supply the plurality of gate signals to the plurality of gate lines GL in accordance with a predetermined order.

The fan-out lines FOL may be extended from the display driver 200 to the display area DA. The fan-out lines FOL may supply the data voltages received from the display driver 200 to the plurality of data lines DL.

The gate control line GCL may be extended from the display driver 200 to the gate driver 210. The gate control line GCL may supply the gate control signals received from the display driver 200 to the gate driver 210.

The sub-area SBA may include a display driver 200, a display pad area DPA, and first and second touch pad areas TPA1 and TPA2.

The display driver 200 may output signals and voltages for driving the display panel 100 to the fan-out lines FOL. The display driver 200 may supply the data voltages to the data lines DL through the fan-out lines FOL. The data voltages may be supplied to the plurality of pixels SP, and may determine luminance of the plurality of pixels SP. The display driver 200 may supply the gate control signals to the gate driver 210 through the gate control line GCL.

The display pad area DPA, the first touch pad area TPA1 and the second touch pad area TPA2 may be disposed on the sub-area SBA. For example, the display pad area DPA, the first touch pad area TPA1 and the second touch pad area TPA2 may be disposed at an edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The display pad area DPA may include a plurality of display pad areas DPP. The plurality of display pad areas DPP may be connected to the main processor 500 through the circuit board 300. The plurality of display pad areas DPP may be connected to the circuit board 300 to receive digital video data, and may supply the digital video data to the display driver 200.

Figure 6:
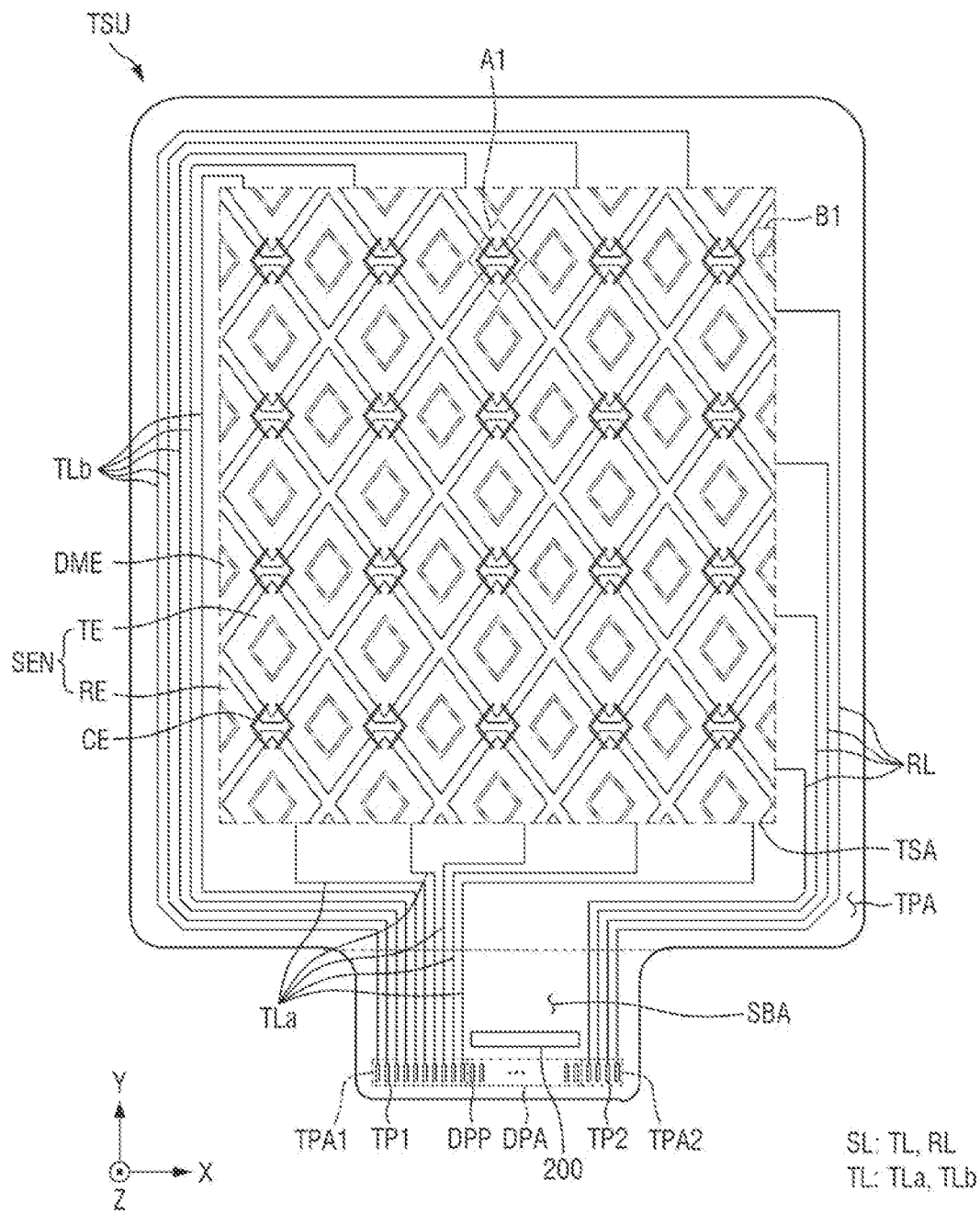
FIG. 6 is a plan view illustrating a touch sensing unit of a display device according to an embodiment of the present invention.

FIG. 6 is a plan view illustrating a touch sensing unit of a display device according to an embodiment of the present invention.

Referring to FIG. 6, the touch sensing unit TSU may include a touch sensor area TSA for sensing a user's touch, and a touch peripheral area TPA disposed near or adjacent to the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DME. The plurality of touch electrodes SEN may form mutual capacitance or self-capacitance to sense an object or a touch of a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a plurality of connection electrodes CE.

The plurality of driving electrodes TE may be connected to a first touch pad TP1 through a driving line TL. The driving line TL may include a lower driving line TLa and an upper driving line TLb. For example, some driving electrodes TE disposed adjacent to a lower portion of the touch sensor area TSA may be connected to the first touch pad TP1 through the lower driving line TLa, and some other driving electrodes TE disposed adjacent to an upper portion of the touch sensor area TSA may be connected to the first touch pad TP1 through the upper driving line TLb. The lower driving line TLa may be extended from a lower side of the touch peripheral area TPA to the first touch pad TP1. The upper driving line TLb may be extended to the first touch pad TP1 via upper, left and lower sides of the touch peripheral area TPA. The first touch pad TP1 may be connected to the touch driver 400 through the circuit board 300.

The connection electrode CE may be bent at least once. For example, the connection electrode CE may have a bent shape (e.g., "<" or ">"), but its planar shape is not limited thereto. The driving electrodes TE adjacent to each other in the Y-axis direction may be connected by the plurality of connection electrodes CE, and even if any one of the connection electrodes CE becomes disconnected, the driving electrodes TE may be stably connected through the other connection electrodes CE. The driving electrodes TE adjacent to each other may be connected by two connection electrodes CE, but the number of the connection electrodes CE is not limited thereto.

The connection electrodes CE may be disposed in a layer different from that of the plurality of driving electrodes TE and the plurality of sensing electrodes RE. The sensing electrodes RE adjacent to each other in the X-axis direction may be electrically connected to each other through a connection portion disposed in the same layer as the plurality of driving electrodes TE or the plurality of sensing electrodes RE. For example, the plurality of sensing electrodes RE may be extended in the X-axis direction and spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection portion.

The driving electrodes TE adjacent to each other in the Y-axis direction may be electrically connected through the connection electrode CE disposed in a layer different from that of the plurality of driving electrodes TE or the plurality of sensing electrodes RE. The connection electrodes CE may be formed in a rear layer (or, e.g., a lower layer) of the layer in which the driving electrodes TE and the sensing electrodes RE are formed. The connection electrodes CE are electrically connected to the driving electrodes TE, which are adjacent to each other, through a plurality of contact holes. Therefore, even though the connection electrodes CE overlap the plurality of sensing electrodes RE in the Z-axis direction, the plurality of driving electrodes TE may be insulated from the plurality of sensing electrodes RE. Mutual capacitance may be formed between the driving electrode TE and the sensing electrode RE.

The plurality of sensing electrodes RE may be connected to a second touch pad TP2 through a sensing line RL. For example, some sensing electrodes RE disposed on a right side of the touch sensor area TSA may be connected to the second touch pad TP2 through the sensing line RL. The sensing line RL may be extended to the second touch pad TP2 via right and lower sides of the touch peripheral area TPA. The second touch pad TP2 may be connected to the touch driver 400 through the circuit board 300.

Each of the plurality of dummy electrodes DME may be surrounded by the driving electrode TE or the sensing electrode RE. Each of the plurality of dummy electrodes DME may be spaced apart from the driving electrode TE or the sensing electrode RE and insulated therefrom. Therefore, the dummy electrode DME may be electrically floated.

In addition, a plurality of grid patterns may be formed in a form separated from at least one of the plurality of driving electrodes TE, the plurality of sensing electrodes RE, or the plurality of dummy electrodes DME at each grid reference point position. In addition, code patterns having a planar code shape are formed at predetermined intervals in some areas in a front direction of at least one of the plurality of driving electrodes TE, the plurality of sensing electrodes RE and the plurality of dummy electrodes DME.

For example, the display pad area DPA, the first touch pad area TPA1 and the second touch pad area TPA2 may be disposed at the edge of the sub-area SBA. The display pad area DPA, the first touch pad area TPA1 and the second touch pad area TPA2 may be electrically connected to the circuit board 300 using a low resistance high reliability material such as an anisotropic conductive film or a self-assembly anisotropic conductive paste (SAP).

The first touch pad area TPA1 may be disposed on one side of the display pad area DPA, and may include a plurality of first touch pads TP1. The plurality of first touch pads TP1 may be electrically connected to the touch driver 400 that is disposed on the circuit board 300. The plurality of first touch pads TP1 may supply the touch driving signal to the plurality of driving electrodes TE through the plurality of driving lines TL.

The second touch pad area TPA2 may be disposed on the other side of the display pad area DPA, and may include a plurality of second touch pads TP2. The plurality of second touch pads TP2 may be electrically connected to the touch driver 400 that is disposed on the circuit board 300. The touch driver 400 may receive a touch sensing signal through the plurality of sensing lines RL that are connected to the plurality of second touch pads TP2, and may sense a mutual capacitance change between the driving electrode TE and the sensing electrode RE.

For another example, the touch driver 400 may supply the touch driving signal to each of the plurality of driving electrodes TE and the plurality of sensing electrodes RE, and may receive the touch sensing signal from each of the plurality of driving electrodes TE and the plurality of sensing electrodes RE. The touch driver 400 may sense a change in capacitance between the plurality of driving electrodes TE and the plurality of sensing electrodes RE based on the touch sensing signal.

Figure 7:
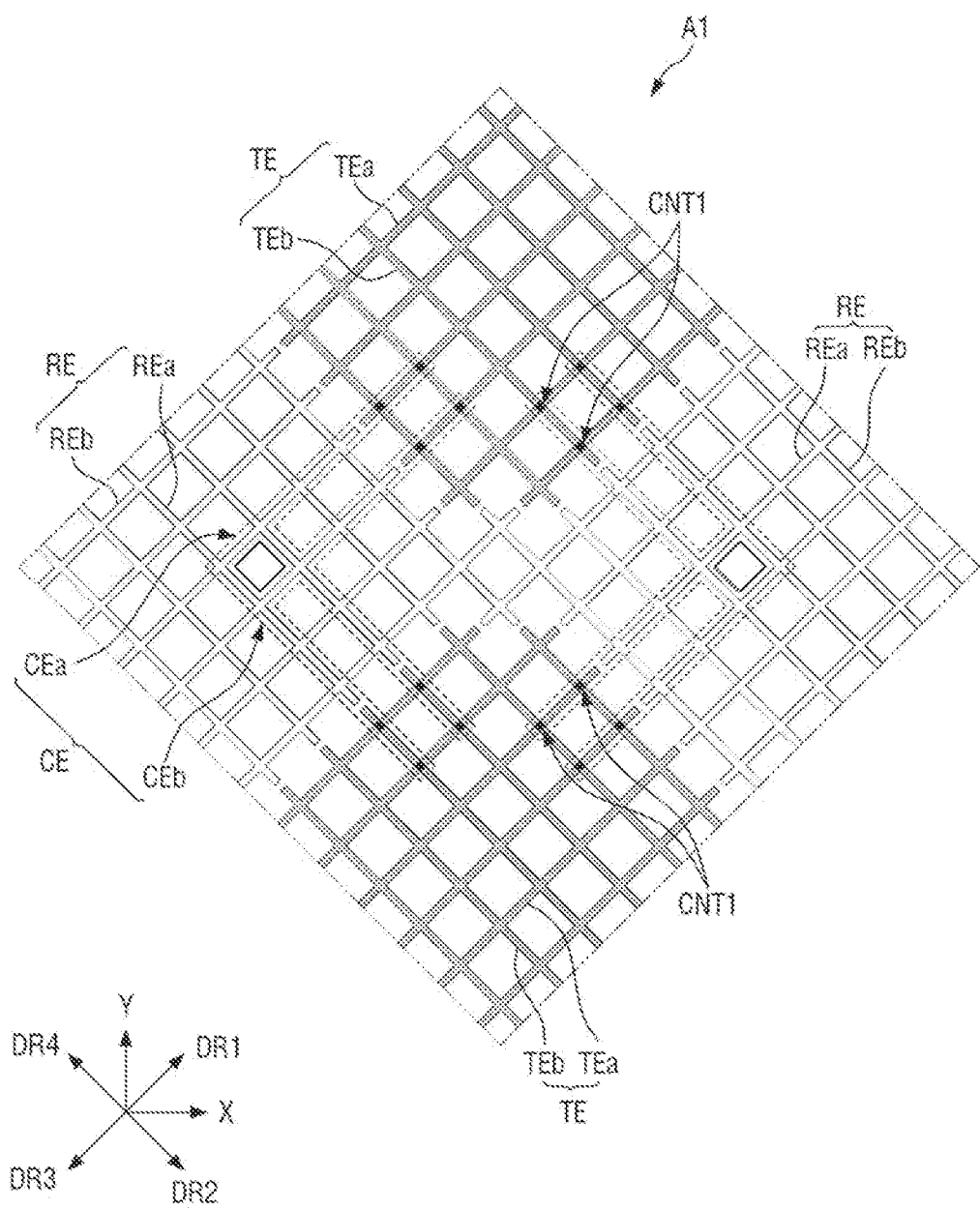
FIG. 7 is a detailed enlarged view illustrating an area A1 of FIG. 6.
Figure 8:
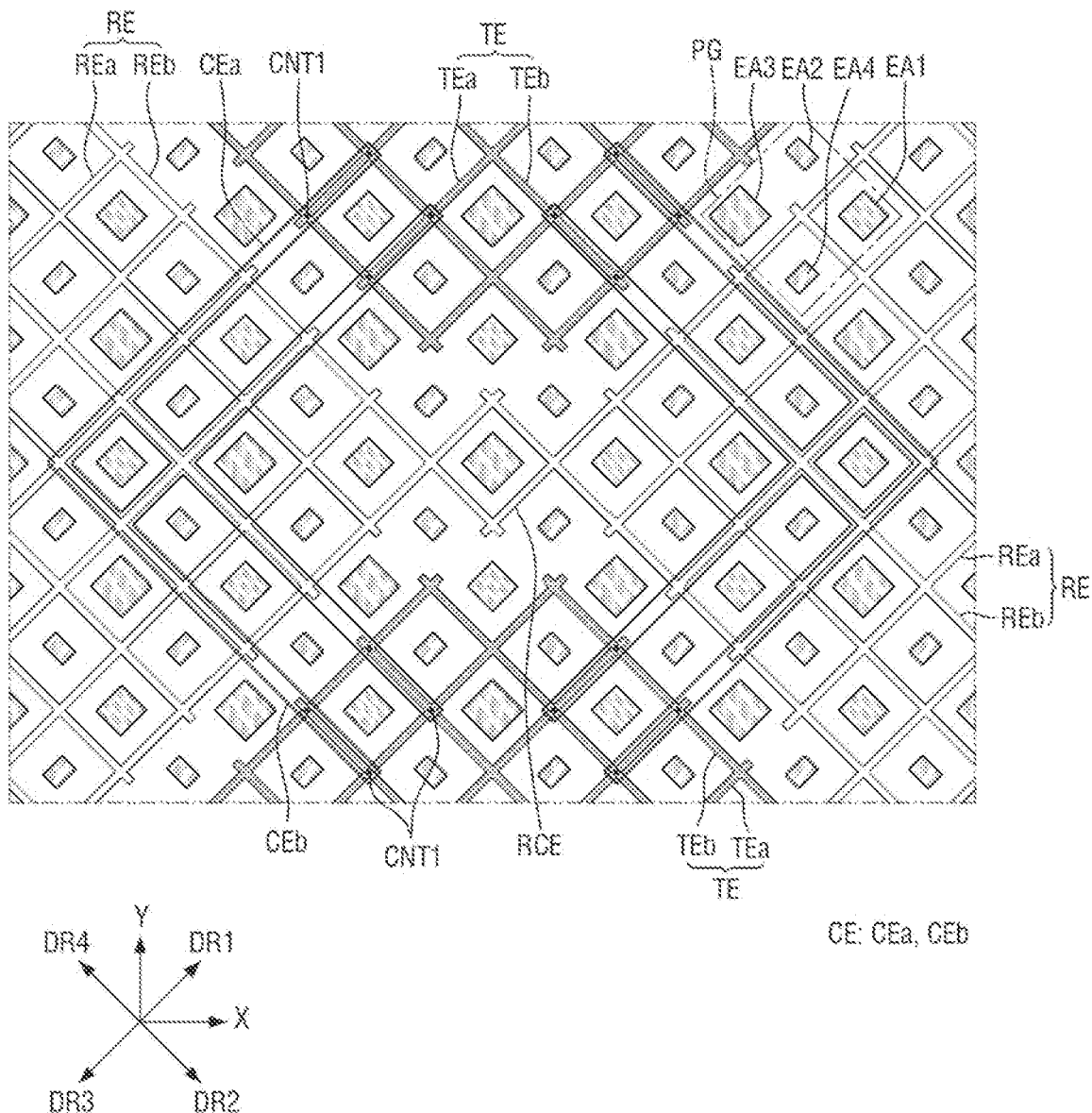
FIG. 8 is a detailed enlarged view illustrating a structure of a connection portion of sensing electrodes and a connection electrode of FIG. 7.

FIG. 7 is a detailed enlarged view illustrating an area A1 of FIG. 6, and FIG. 8 is a detailed enlarged view illustrating a structure of a connection portion of sensing electrodes and a connection electrode of FIG. 7.

Referring to FIGS. 7 and 8, the plurality of driving electrodes TE, the plurality of sensing electrodes RE and the plurality of dummy electrodes DME may be disposed in the same layer, and may be spaced apart from one another.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the connection electrode CE.

The plurality of sensing electrodes RE may be extended in the X-axis direction, and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other. For example, the sensing electrodes RE may be electrically connected to each other through a connection portion RCE, and the connection portion RCE may be disposed within a shortest distance between adjacent driving electrodes TE.

The plurality of connection electrodes CE may be disposed in a layer, which is different from the driving electrode TE and the sensing electrode RE, for example, a rear layer. The connection electrode CE may include a first portion CEa and a second portion CEb. For example, the first portion CEa of the connection electrode CE may be connected to a first driving electrode TE through a first contact hole CNT1 and may be extended in a third direction DR3. The second portion CEb of the connection electrode CE may be extended in a second direction DR2 by being bent from the first portion CEa in an area overlapped with the sensing electrode RE, and may be connected to a second driving electrode TE, adjacent to the first driving electrode TE, in the Y-axis direction through the first contact hole CNT1. Hereinafter, a first direction DR1 may be a direction between the X-axis direction and the Y-axis direction, the second direction DR2 may be a direction between an opposite direction of the Y-axis direction and the X-axis direction, the third direction DR3 may be an opposite direction of the first direction DR1, and a fourth direction DR4 may be an opposite direction of the second direction DR2. Therefore, each of the plurality of connection electrodes CE may connect the driving electrodes TE adjacent to each other in the Y-axis direction with each other.

Each unit pixel group PG may include first to third subpixels or first to fourth subpixels, and each of the first to fourth subpixels may include first to fourth light emission areas EA1, EA2, EA3 and EA4. For example, the first light emission area EA1 may emit light of a first color or red light, the second light emission area EA2 may emit light of a second color or green light, and the third light emission area EA3 may emit light of a third color or blue light. The fourth light emission area EA4 may emit light of a fourth color or light of any one of the first to third colors, but these light emission areas are not limited thereto.

Each unit pixel group PG may express a white gray scale through the first to third light emission areas EA1 to EA3, or the first to fourth light emission areas EA1, EA2, EA3 and EA4. A gray scale of various colors such as a white gray scale may be expressed by combination of light emitted from the first to third light emission areas EA1 to EA3 or the first to fourth light emission areas EA1 to EA4.

The plurality of driving electrodes TE, the plurality of sensing electrodes RE and the plurality of dummy electrodes DME may be formed in a planar mesh structure or a netted structure in accordance with the arrangement structure of the respective pixels SP, that is, the first to third subpixels or the first to fourth subpixels.

The plurality of driving electrodes TE, the plurality of sensing electrodes RE and the plurality of dummy electrodes DME may surround portions among the first to third light emission areas EA1 to EA3 or the first to fourth light emission areas EA1 to EA4, which constitute the unit pixel group PG on a plane, or a periphery thereof. Therefore, the plurality of driving electrodes TE, the plurality of sensing electrodes RE and the plurality of dummy electrodes DME might not overlap the first to fourth light emission areas EA1 to EA4. The plurality of connection electrodes CE might not overlap the first to fourth light emission areas EA1 to EA4, either. Therefore, the display device 10 may prevent luminance of light emitted from the first to fourth light emission areas EA1 to EA4 from being reduced by the touch sensing unit TSU.

Each of the plurality of driving electrodes TE may be formed to include a first portion TEa that is extended in the first direction DR1 and a second portion TEb that is extended in the second direction DR2, and thus, each of the plurality of driving electrodes TE might not overlap the first to fourth light emission areas EA1 to EA4. Each of the plurality of sensing electrodes RE may be formed to include a first portion REa that is extended in the first direction DR1 and a second portion REb that is extended in the second direction DR2, and thus, each of the plurality of sensing electrodes RE might not overlap the first to fourth light emission areas EA1 to EA4. The plurality of dummy electrodes DME are also formed so as not to overlap the first to fourth light emission areas EA1 to EA4.

Figure 9:
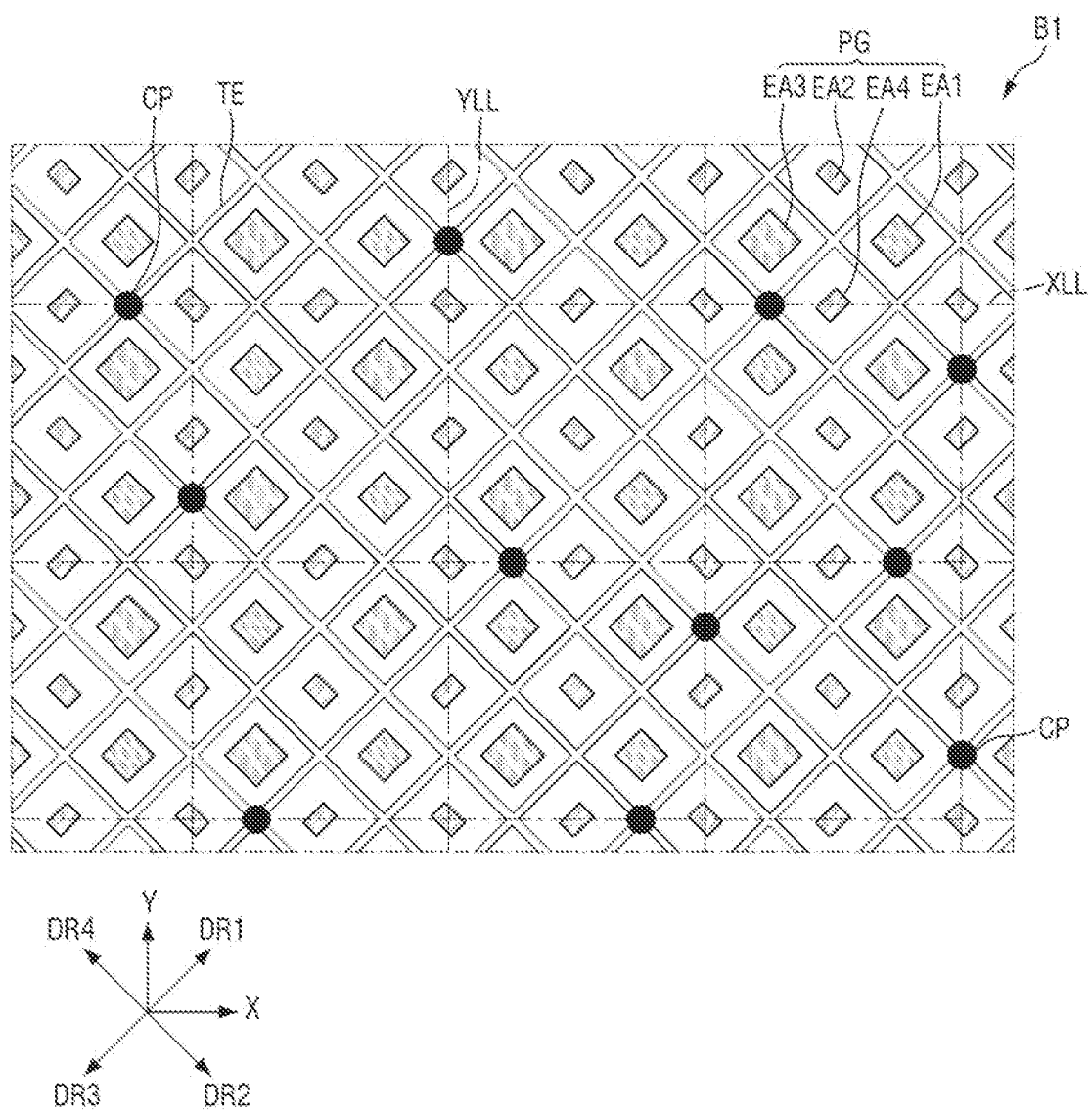
FIG. 9 is an enlarged view illustrating an arrangement structure of code patterns formed in an area B1 of FIG. 6 according to an embodiment of the present invention.
Figure 10:
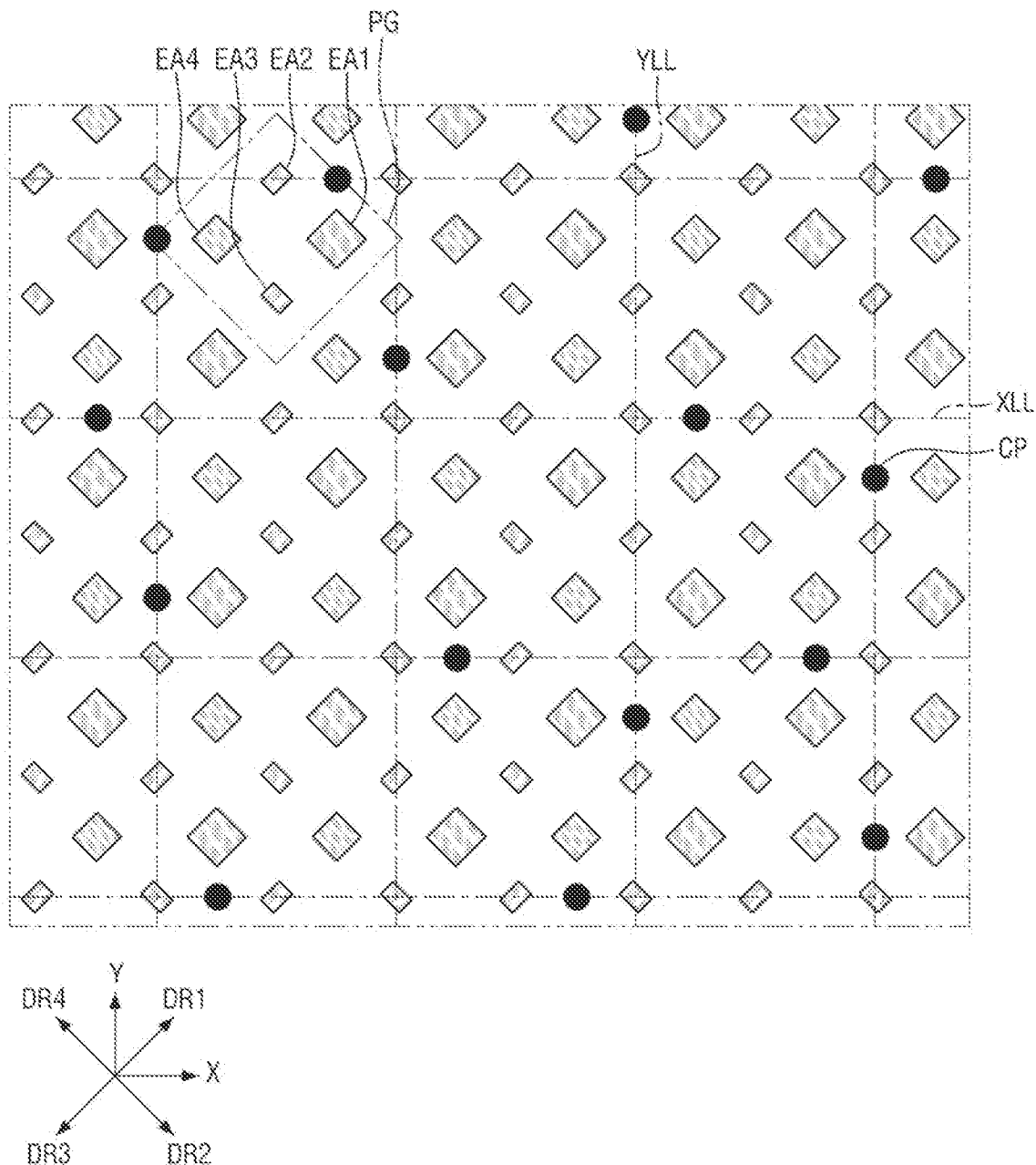
FIG. 10 is a detailed enlarged view illustrating an arrangement structure of code patterns formed between respective light emission areas.

FIG. 9 is an enlarged view illustrating an arrangement structure of code patterns formed in an area B1 of FIG. 6 according to an embodiment of the present invention, and FIG. 10 is a detailed enlarged view illustrating an arrangement structure of code patterns formed between respective light emission areas.

Referring to FIGS. 9 and 10, each of the code patterns CP may be formed and disposed in a non-light emission area between the light emission areas EA1, EA2, EA3 and EA4 so as not to overlap the light emission areas EA1, EA2, EA3 and EA4 of each unit pixel group PG.

The respective code patterns CP may be formed in a planar code shape having a predetermined area in the front direction of some of the plurality of touch electrodes SEN.

The respective code patterns CP may be formed at upper, lower, left and right positions of the crossing points or at positions corresponding to the crossing points based on virtually preset vertical and horizontal grid reference lines XLL and YLL and crossing point positions of the grid reference lines XLL and YLL. For example, the respective code patterns CP may be formed at a predetermined interval in an upper direction (e.g., Y-axis direction) of the crossing point position to be adjacent to the crossing point positions of the grid reference lines XLL and YLL, or may be formed at a predetermined interval in a lower direction (e.g., −Y-axis direction) of the crossing point position. In addition, the respective code patterns CP may be formed at a predetermined interval in a right direction (e.g., X-axis direction) of the crossing point position to be adjacent to the crossing point positions, or may be formed at a predetermined interval in a left direction (e.g., −X-axis direction) of the crossing point position.

To define the vertical and horizontal grid reference lines XLL and YLL, grid patterns may be further formed of the same material through the same process as that of the touch electrodes when the touch electrodes are formed. Digital coordinate data may be extracted depending on an arrangement position of each of the code patterns CP relative to the crossing point positions of the grid reference lines XLL and YLL according to the grid patterns.

FIG. 11 is a view illustrating a method of analyzing a code pattern position of a code processor of a touch input device shown in FIGS. 1 and 2.

Referring to FIG. 11, the code detector 21 of the touch input device 20 emits infrared light by using at least one infrared light source, and detects infrared light reflected from a partial surface of the touch sensing unit TSU that includes the code patterns CP through an infrared camera. The code detector 21 provides the code processor 23 with the shape data of the code patterns CP according to the infrared reflected from the surface of the code patterns CP.

The code processor 23 sets the virtual vertical and horizontal grid reference lines XLL and YLL and crossing point positions Pn of the grid reference lines XLL and YLL at predetermined intervals. In addition, the code processor 23 matches the shape data of the code patterns CP with the crossing point positions Pn of the grid reference lines XLL and YLL to analyze the arrangement position of the code patterns CP based on the crossing point positions Pn.

TABLE 1

| 4 | 3 | 2 | 1 |
|---|---|---|---|
| 3 | 2 | 1 | 4 |
| 2 | 1 | 4 | 3 |
| 1 | 4 | 3 | 2 |

For example, referring to Table 1 matching with FIG. 11, the code processor 23 may detect the code pattern CP as digital code 1 when the code pattern CP relative to each crossing point position Pn is positioned in the X-axis direction that is a right direction, and may detect the code pattern as digital code 2 when the code pattern CP is positioned in the Y-axis direction that is an upper direction of the crossing point position Pn.

In addition, when the code pattern CP is positioned in –X-axis direction that is a left direction of the crossing point position Pn, the code processor 23 may detect the code pattern CP as digital code 3, and when the code pattern CP is positioned in –Y-axis direction that is a lower direction of the crossing point position Pn, the code processor 23 may detect the code pattern CP as digital code 4.

Figure 12:
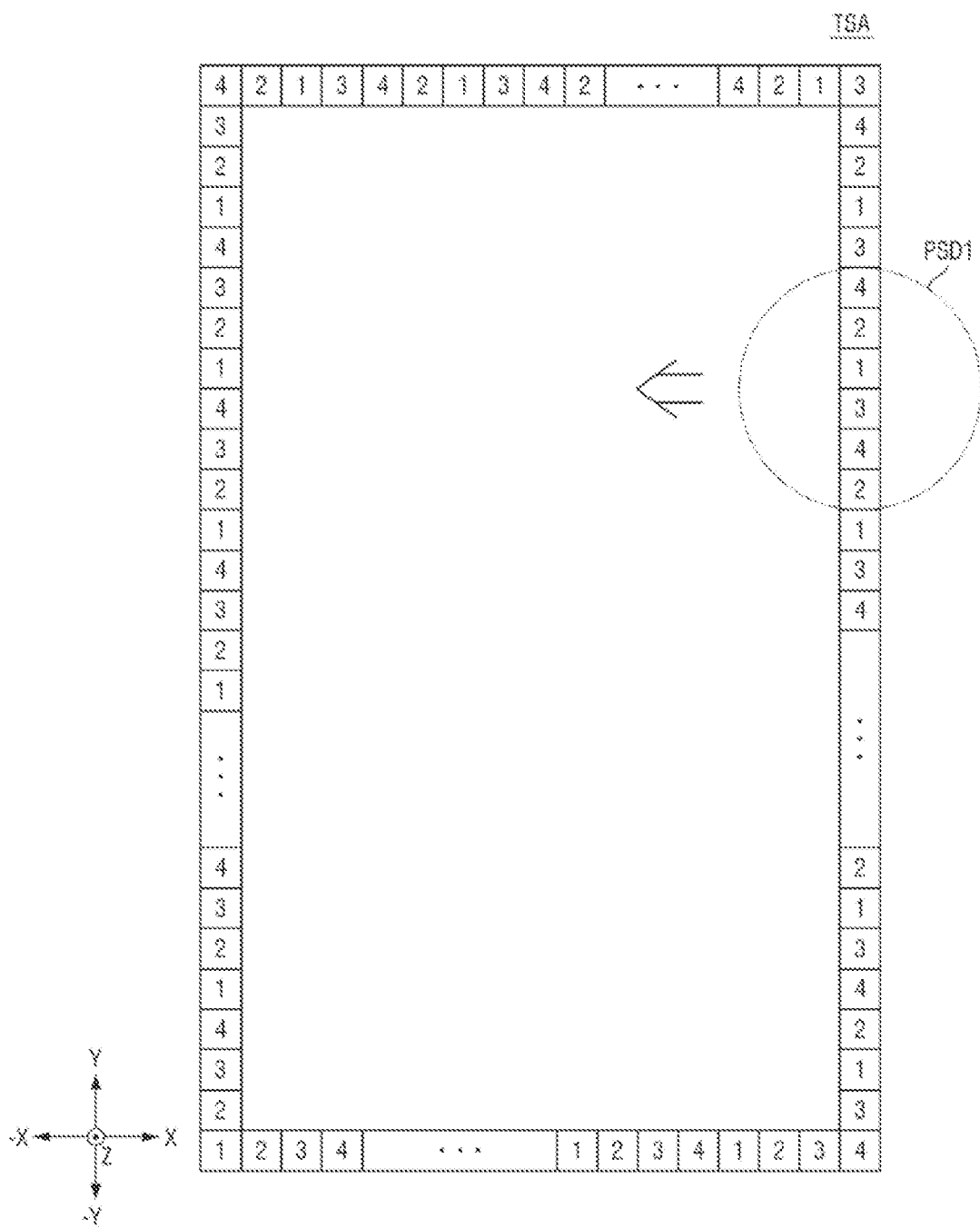
FIG. 12 is a view illustrating position codes formed by code patterns of a touch sensor area.

FIG. 12 is a view illustrating position codes formed by code patterns of a touch sensor area, and FIG. 13 is a view illustrating a method of recognizing a position code detected by a touch input device and a detected position.

Referring to FIG. 12, code patterns CP indicating preset direction designated position codes may be repeatedly formed in an outermost area of at least one direction, for example, upper, lower, left or right direction of the touch sensing unit TSU or the touch sensor area TSA.

As an example, in the outermost area of the X-axis direction that is the right direction of the touch sensor area TSA, code patterns CP indicating position codes designating the X-axis direction of the touch sensor area TSA, for example, code patterns CP indicating X-axis direction designated position codes, such as '2134', may be repeatedly formed. In addition, in the outermost area of –Y-axis direction that is the lower direction of the touch sensor area TSA, code patterns CP indicating position codes designating the –Y-axis direction of the touch sensor area TSA, for example, code patterns CP indicating –Y-axis direction designated position codes, such as '1234', may be repeatedly formed.

In addition, in the outermost area of –X-axis direction that is the left direction of the touch sensor area TSA, code patterns CP indicating position codes designating –X-axis direction of the touch sensor area TSA, for example, code patterns CP indicating –X-axis direction designated position codes, such as '4321', may be repeatedly formed. In addition, in the outermost area of Y-axis direction that is the upper direction of the touch sensor area TSA, code patterns CP indicating position codes designating the Y-axis direction of the touch sensor area TSA, for example, code patterns CP indicating Y-axis direction designated position codes, such as '4213', may be repeatedly formed.

The code detector 21 of the touch input device 20 detects infrared reflective light from a first detection area PSD1 that is first touched and generates shape data for the code patterns CP in accordance with a moving direction of the touch input device 20 and a matrix structure of the optical image sensor.

The code processor 23 of the touch input device 20 sets vertical and horizontal grid reference lines XLL and YLL and crossing point positions Pn of the grid reference lines XLL and YLL, and matches the shape data for the code patterns CP of the first detection area PSD1 with the crossing point positions Pn of the grid reference lines XLL and YLL. The code processor 23 extracts digital position codes (or, e.g., code numbers) in accordance with the arrangement position of the code patterns CP relative to each crossing point position Pn.

The code processor 23 may compare the digital position codes extracted from the first detection area PSD1 with designated position codes preset in the memory 25 to first detect a touch start and an entry position for the first detection area PSD1 from which a touch of the touch input device 20 starts. In addition, the code processor 23 may share touch coordinate data of the first detection area PSD1 with the main processor 500.

Referring to FIG. 13, when the X-axis direction designated position codes (e.g., '2134') are detected through the shape data of the code patterns CP of the first detection area PSD1 from which the touch starts, the code processor 23 of the touch input device 20 compares the detected X-axis direction designated position codes with designated position codes preset in the memory 25. In accordance with the comparison result of the position codes, the code processor 23 may detect entry direction coordinates as the touch input device 20 enters the touch sensor area TSA in the X-axis direction that is the right direction of the touch sensor area TSA.

In contrast, when the touch input device 20 detects the Y-axis direction designated position codes (e.g., '1234') at a touch start timing point, the touch input device 20 may detect the entry direction of the touch input device 20 entering the touch sensor area TSA in the –Y-axis direction that is the lower direction of the touch sensor area TSA. In this way, the touch input device 20 may extract its entry direction coordinates or information in accordance with direction designated position codes extracted through code pattern shape data of the first detection area PSD1 from which the touch starts.

Figure 14:
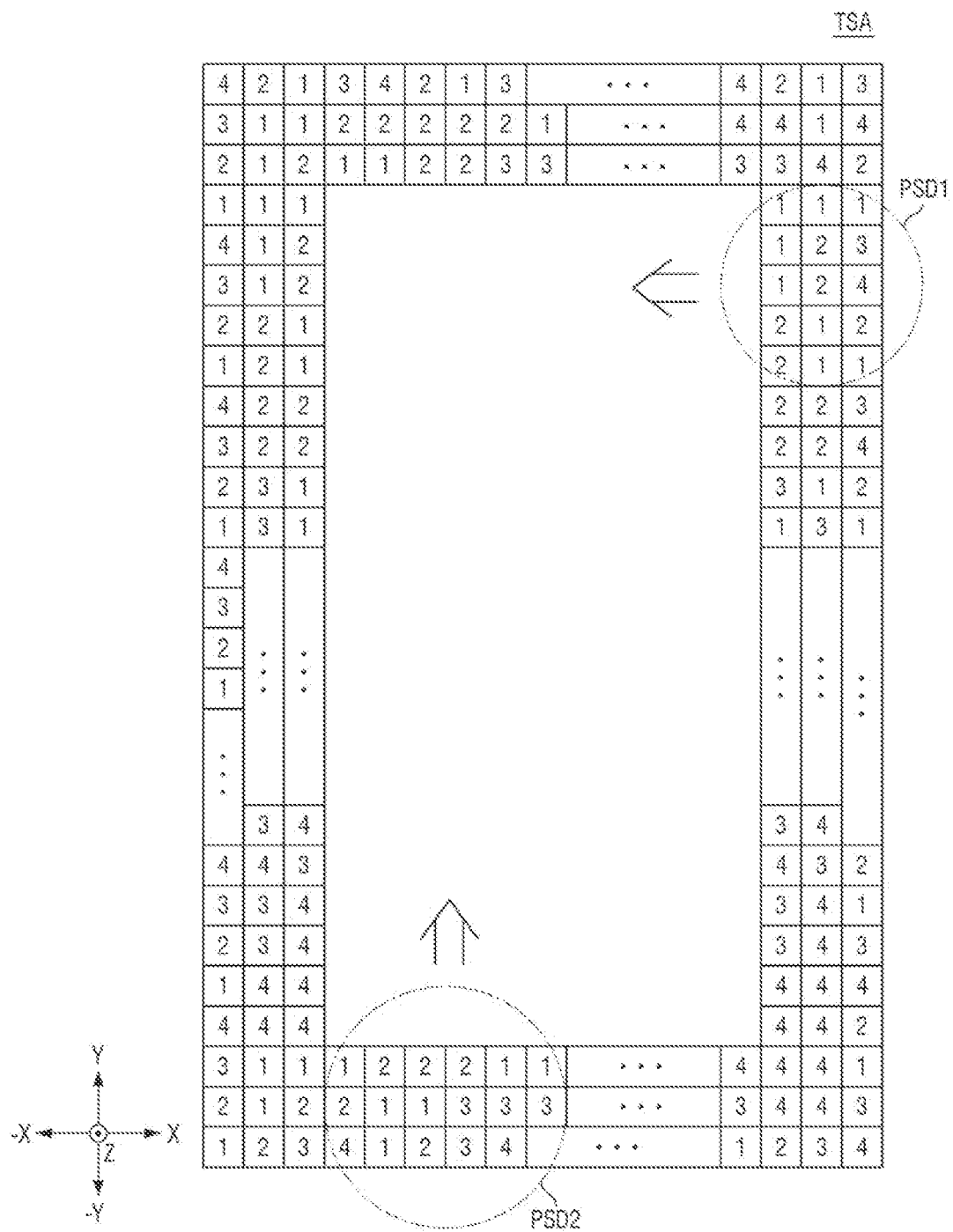
FIG. 14 is a view illustrating position codes formed in an outer area of a touch sensor area.

FIG. 14 is a view illustrating position codes formed in an outer area of a touch sensor area, and FIG. 15 is another view illustrating a method of recognizing position codes detected by a touch input device and a detected position.

Referring to FIG. 14, code patterns CP indicating position coordinate codes of a preset X-axis or Y-axis direction may be repeatedly formed in an outer area adjacent to the outermost area in at least one direction, for example, upper, lower, left or right direction of the touch sensing area TSA.

As an example, in the outer area in the X-axis direction, which is adjacent to the outermost area in the X-axis direction that is the right direction of the touch sensor area TSA, code patterns CP indicating position coordinate codes designating position coordinates in the Y-axis direction, for example, code patterns CP indicating position coordinate codes in the Y-axis direction, such as '1221/1112', may be repeatedly formed. In addition, in the outer area in the −Y-axis direction, which is adjacent to the outermost area in the −Y-axis direction that is the lower direction of the touch sensor area TSA, code patterns CP indicating position coordinate codes designating position coordinates in the X-axis direction, for example, code patterns CP indicating position coordinate codes in the X-axis direction, such as '2221/2133', may be repeatedly formed.

In addition, in the outer area in the −X-axis direction, which is adjacent to the outermost area in −X-axis direction that is the left direction of the touch sensor area TSA, code patterns CP indicating position codes designating position coordinates in the Y-axis direction, for example, code patterns CP indicating position coordinate codes in the Y-axis direction, such as '1221/1112', may be repeatedly formed. In addition, in the outer area in the Y-axis direction, which is adjacent to the outermost area in the Y-axis direction that is the upper direction of the touch sensor area TSA, code patterns CP indicating position codes designating position coordinates in the X-axis direction, for example, code patterns CP indicating position coordinate codes in the X-axis direction, such as '2221/2133', may be repeatedly formed.

Referring to FIGS. 14 and 15, when detecting touch position coordinates of the touch input device 20, the code processor 23 of the touch input device 20 sets crossing point positions Pn of vertical and horizontal grid reference lines XLL and YLL and matches the shape data for the code patterns CP of the first detection area PSD1 with the crossing point positions Pn of the grid reference lines XLL and YLL.

When the designated position codes (e.g., '2134') of the outermost area in the X-axis direction are detected through the code pattern shape data of the first detection area PSD1 from which the touch starts, the code processor 23 of the touch input device 20 may first detect an entry direction in which the touch input device 20 enters the touch sensor area TSA in the X-axis direction that is the right direction of the touch sensor area TSA. When Y-axis position coordinate codes of the outer area, which are adjacent to the X-axis direction designated position codes, are detected, the code processor 23 may detect Y-axis position coordinates based on the Y-axis position coordinate codes. For example, the code processor 23 may generate position coordinate data of the first detection area PSD1 by combining X-axis direction entry information with the Y-axis position coordinates of the first detection area PSD1 from which the touch starts.

Afterwards, when an additional touch of the touch input device 20 is performed, so that infrared light is irradiated to the second detection area PSD2 and reflective light is detected, the touch input device 20 may determine that the touch input starts again in the second detection area PSD2. In this case, when the −Y-axis direction designated position codes (e.g., '1234') of the outermost area are detected through the code pattern shape data of the second detection area PSD2, the touch input device 20 may first detect the entry direction in which the touch input device 20 enters the touch sensor area TSA in the −Y-axis direction that is the lower direction of the touch sensor area TSA. When X-axis position coordinate codes of the outer area, which are adjacent to the −Y-axis direction designated position codes, are detected, the code processor 23 may detect X-axis position coordinates in accordance with the X-axis position coordinate codes (e.g., '2221/2133') adjacent to the −Y-axis direction designated position codes. For example, the code processor 23 may generate position coordinate data of the second detection area PSD2 by combining −Y-axis direction entry information with the X-axis position coordinates of the second detection area PSD2 from which the touch re-starts.

Figure 16:
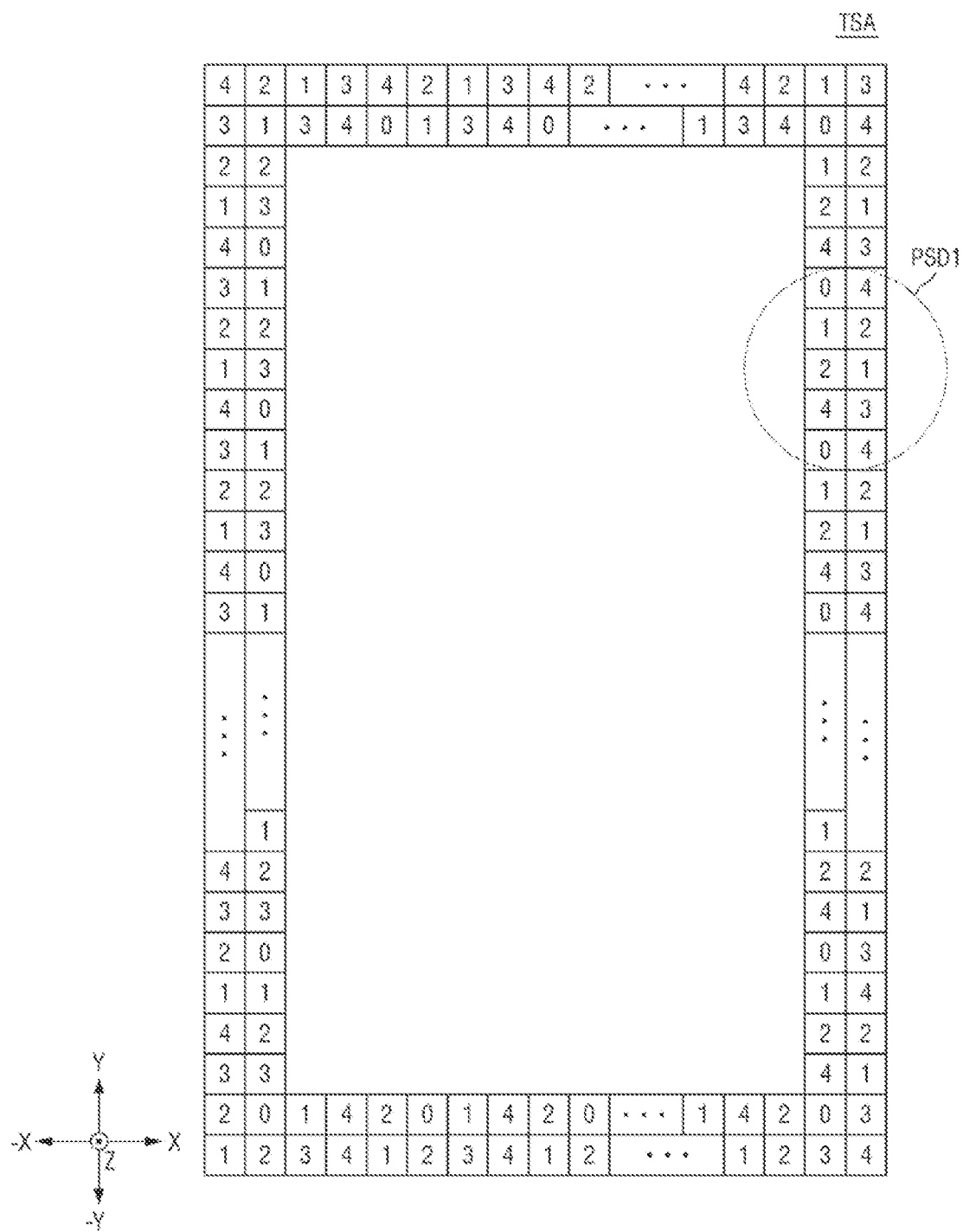
FIG. 16 is a view illustrating position codes formed by code patterns of a touch sensor area.

FIG. 16 is a view illustrating position codes formed by code patterns of a touch sensor area, and FIG. 17 is another view illustrating a method of recognizing position codes detected by a touch input device and a detected position.

Referring to FIG. 16, code patterns CP indicating preset direction designated position codes may be repeatedly formed in an outer area of at least one direction, for example, upper, lower, left or right direction of the touch sensing unit TSU or the touch sensor area TSA. In this case, the direction designated position codes may be formed with at least four numeric codes including 0 and 3, or 0 and 4.

As an example, in the outer area in the X-axis direction that is the right direction of the touch sensor area TSA, code patterns CP indicating position codes designating the X-axis direction of the touch sensor area TSA, for example, code patterns CP indicating X-axis direction designated position codes, such as '1240', may be repeatedly formed. In addition, in the outer area in −Y-axis direction that is the lower direction of the touch sensor area TSA, code patterns CP indicating position codes designating the −Y-axis direction of the touch sensor area TSA, for example, code patterns CP indicating −Y-axis direction designated position codes, such as '1420', may be repeatedly formed.

In addition, in the outer area in −X-axis direction that is the left direction of the touch sensor area TSA, code patterns CP indicating position codes designating −X-axis direction of the touch sensor area TSA, for example, code patterns CP indicating −X-axis direction designated position codes, such as '1230', may be repeatedly formed. In addition, in the outer area in Y-axis direction that is the upper direction of the touch sensor area TSA, code patterns CP indicating position codes designating the Y-axis direction of the touch sensor area TSA, for example, code patterns CP indicating Y-axis direction designated position codes, such as '1340', may be repeatedly formed.

FIG. 18 is a view illustrating a method of analyzing a code pattern position of a code processor of a touch input device according to an embodiment of the present invention.

Referring to FIG. 18, the code detector 21 of the touch input device 20 detects infrared reflective light from the first detection area PSD1 from which the touch first starts, in accordance with the moving direction of the touch input device 20 and the matrix structure of the optical image sensor, and generates shape data for the code patterns CP.

The code processor 23 of the touch input device 20 sets vertical and horizontal grid reference lines XLL and YLL and crossing point positions Pn of the grid reference lines XLL and YLL and matches the shape data of the code patterns CP of the first detection area PSD1 with the crossing point positions Pn of the grid reference lines XLL and YLL. The code processor 23 extracts digital position codes (or, e.g., code numbers) in accordance with the arrangement position of the code pattern CP relative to each crossing point position Pn. As described above, each of the code patterns CP may be formed of a reflective member including a metal material to reflect incident infrared light to a front surface.

For example, referring to FIG. 18, when the code pattern CP is positioned in the X-axis direction that is a right direction with respect to each crossing point position Pn, the code processor 23 may detect the code pattern CP as digital code 1, and when the code pattern CP is positioned in the Y-axis direction that is an upper direction of the crossing point position Pn, the code processor 23 may detect the code pattern CP as digital code 2. In addition, when the code pattern CP is positioned in the −X-axis direction that is a left direction of the crossing point position Pn, the code processor 23 may detect the code pattern CP as digital code 3, and when the code pattern CP is positioned in the −Y-axis direction that is a lower direction of the crossing point position Pn, the code processor 23 may detect the code pattern CP as digital code 4. In addition, when the code pattern CP is positioned in the same position as the crossing point position Pn, the code processor 23 may detect the code pattern CP as digital code 0.

Afterwards, the code processor 23 may compare the digital position codes extracted from the first detection area PSD1 with designated position codes preset in the memory 25 to first detect a touch start and an entry position for the first detection area PSD1 from which the touch of the touch input device 20 starts. In addition, the code processor 23 may share touch coordinate data of the first detection area PSD1 with the main processor 500.

Referring back to FIG. 17, when the X-axis direction designated position codes (e.g., '1240') are detected through the shape data of the code patterns CP of the first detection area PSD1 from which the touch starts, the code processor 23 of the touch input device 20 compares the detected X-axis direction designated position codes with designated position codes preset in the memory 25. In accordance with the comparison result of the position codes, the code processor 23 may detect an entry direction in which the touch input device 20 of the code processor 23 enters the touch sensor area TSA in the X-axis direction that is the right direction of the touch sensor area TSA.

In addition, when the touch input device 20 detects the −Y-axis direction designated position codes (e.g., '1420') at a touch start timing point, the touch input device 20 may detect the entry direction of the touch input device 20 entering the touch sensor area TSA in the −Y-axis direction that is the lower direction of the touch sensor area TSA. In this way, the touch input device 20 may extract its entry direction coordinates or information in accordance with direction designated position codes extracted through code pattern shape data of the first detection area PSD1 from which the touch starts.

Figure 19:
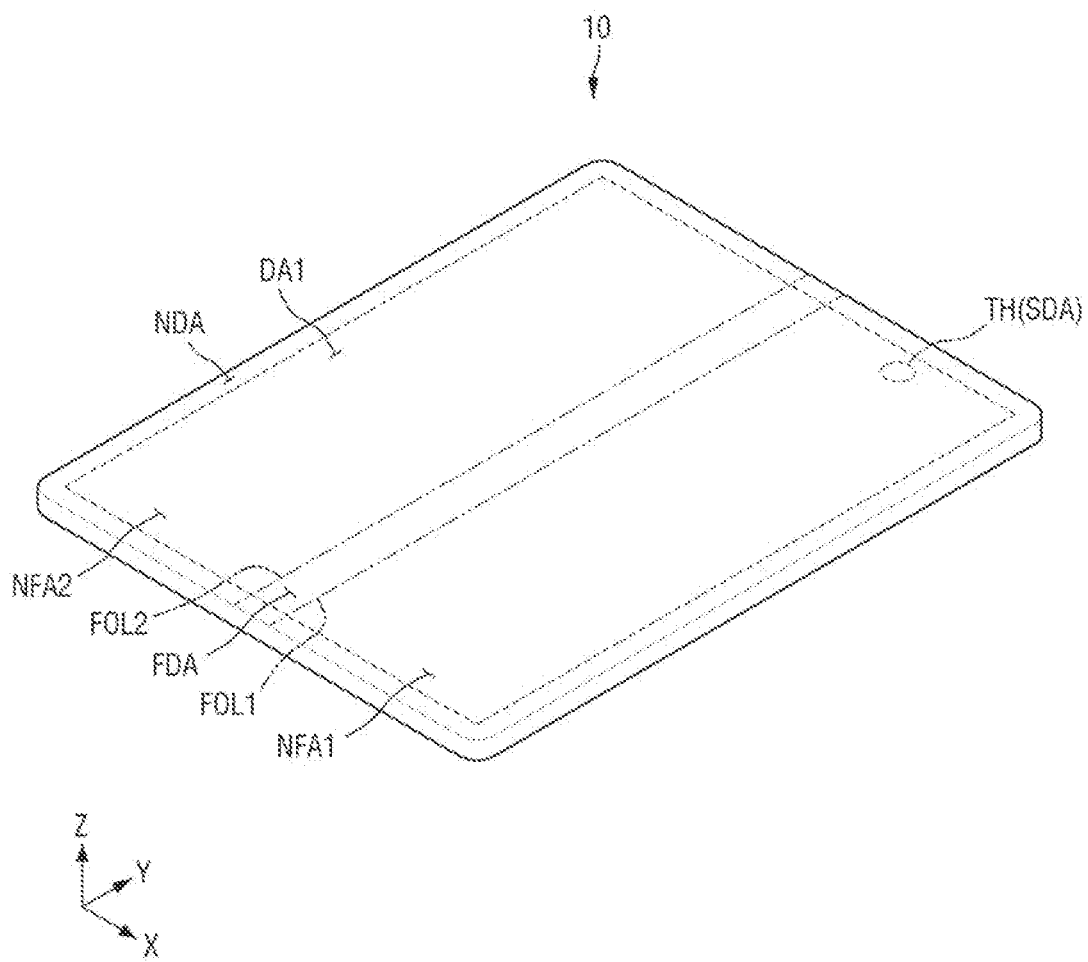
FIGS. 19 and 20 are perspective views illustrating a display device according to an embodiment of the present invention.
Figure 20:
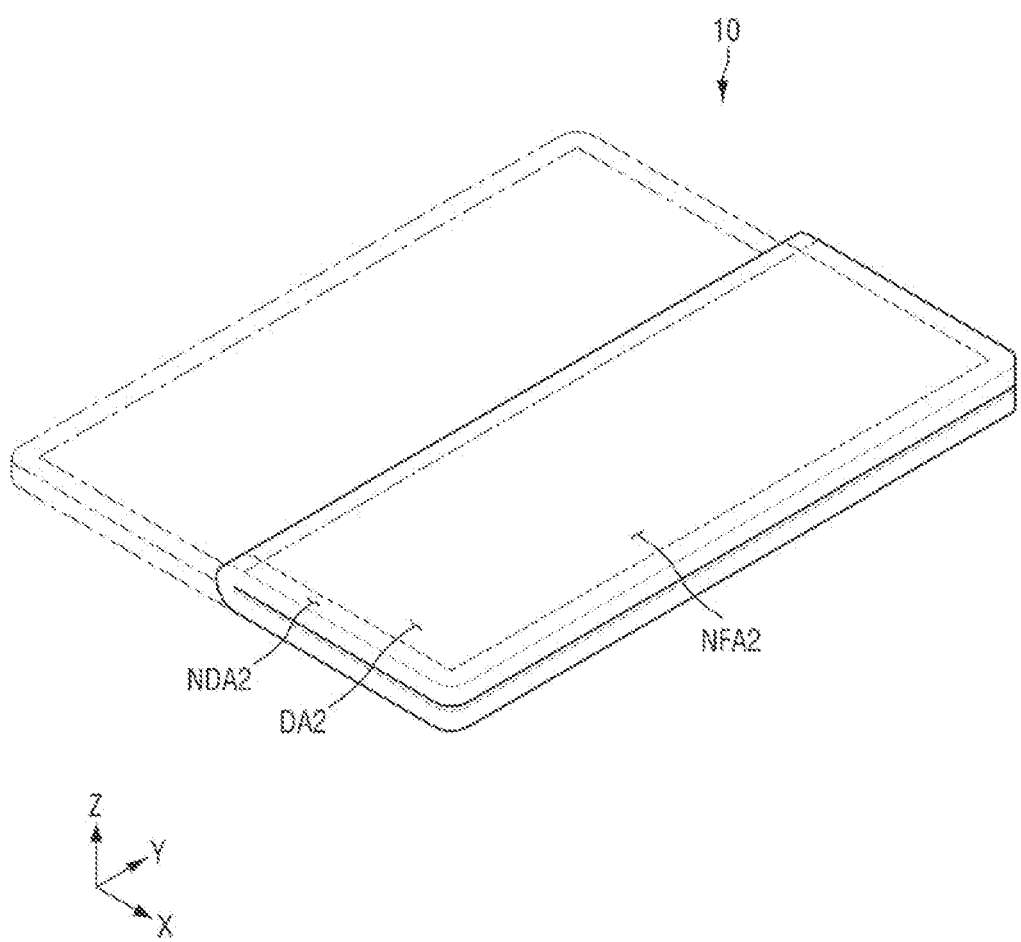

FIGS. 19 and 20 are perspective views illustrating a display device according to an embodiment of the present invention.

FIGS. 19 and 20 illustrate that the display device 10 is a foldable display device in which the display device 10 may be folded in the first direction (e.g., the X-axis direction). The display device 10 may maintain both a folded state and an unfolded state. The display device 10 may be folded in an in-folding manner in which a front surface is disposed inside; however, the present invention is not limited thereto, and the display device 10 may be folded in an out-folding manner in which the front surface is exposed to the outside. When the display device 10 is bent or folded in an in-folding manner, front surfaces of the display device 10 may be disposed to face each other. In addition, the display device 10 may be folded in an out-folding manner in which the front surface is disposed outside. When the display device 10 is bent or folded in an out-folding manner, rear surfaces of the display device 10 may be disposed to face each other.

A first non-folding area NFA1 may be disposed on one side of a folding area FDA, for example, on a right side thereof. A second non-folding area NFA2 may be disposed on the other side of the folding area FDA, for example, on a left side thereof. The touch sensing unit TSU according to one embodiment of the present invention may be formed and disposed on the first non-folding area NFA1 and the second non-folding area NFA2, respectively.

A first folding line FOL1 and a second folding line FOL2 may be extended in the second direction (e.g., the Y-axis direction), and the display device 10 may be folded in the first direction (e.g., the X-axis direction). As a result, since a length of the display device 10 in the first direction (e.g., the X-axis direction) may be reduced to half, approximately, a user may conveniently carry the display device 10.

The extended direction of the first folding line FOL1 and the extended direction of the second folding line FOL2 are not limited to the second direction (e.g., the Y-axis direction). For example, the first folding line FOL1 and the second folding line FOL2 may be extended in the first direction (e.g., the X-axis direction), and the display device 10 may be folded in the second direction (e.g., the Y-axis direction). In this case, the length of the display device 10 in the second direction (e.g., the Y-axis direction) may be reduced to half, approximately. In addition, the first folding line FOL1 and the second folding line FOL2 may be extended in a diagonal direction of the display device 10 between the first direction (e.g., the X-axis direction) and the second direction (e.g., the Y-axis direction). In this case, the display device 10 may be folded in a triangular shape.

When the first folding line FOL1 and the second folding line FOL2 are extended in the second direction (e.g., the Y-axis direction), the length of the folding area FDA in the first direction (e.g., the X-axis direction) may be shorter than that of the folding area FDA in the second direction (e.g., the Y-axis direction). In addition, the length of the first non-folding area NFA1 in the first direction (e.g., the X-axis direction) may be longer than that of the folding area FDA in the first direction (e.g., the X-axis direction). The length of the second non-folding area NFA2 in the first direction (e.g., the X-axis direction) may be longer than that of the folding area FDA in the first direction (e.g., the X-axis direction).

A first display area DA1 may be disposed on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1 and the second non-folding area NFA2 of the display device 10.

The second display area DA2 may be disposed on the rear surface of the display device 10. The second display area DA2 may overlap the second non-folding area NFA2. Therefore, when the display device 10 is folded, an image may be displayed in a front direction in the second non-folding area NFA2 of the display device 10.

Although FIGS. 19 and 20 illustrate that a through hole TH, in which a camera SDA or the like is formed, is disposed in the first non-folding area NFA1, the present invention is not limited thereto. The through hole TH and/or the camera SDA may be disposed in the second non-folding area NFA2 or the folding area FDA.

Figure 21:
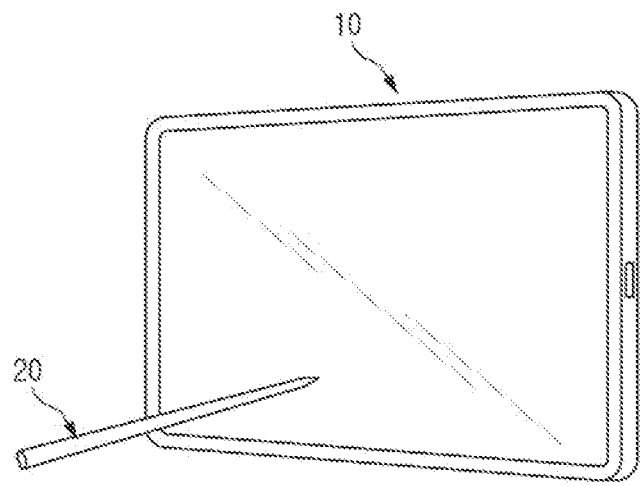
FIGS. 21 and 22 are perspective views illustrating a display device according to an embodiment of the present invention.
Figure 22:
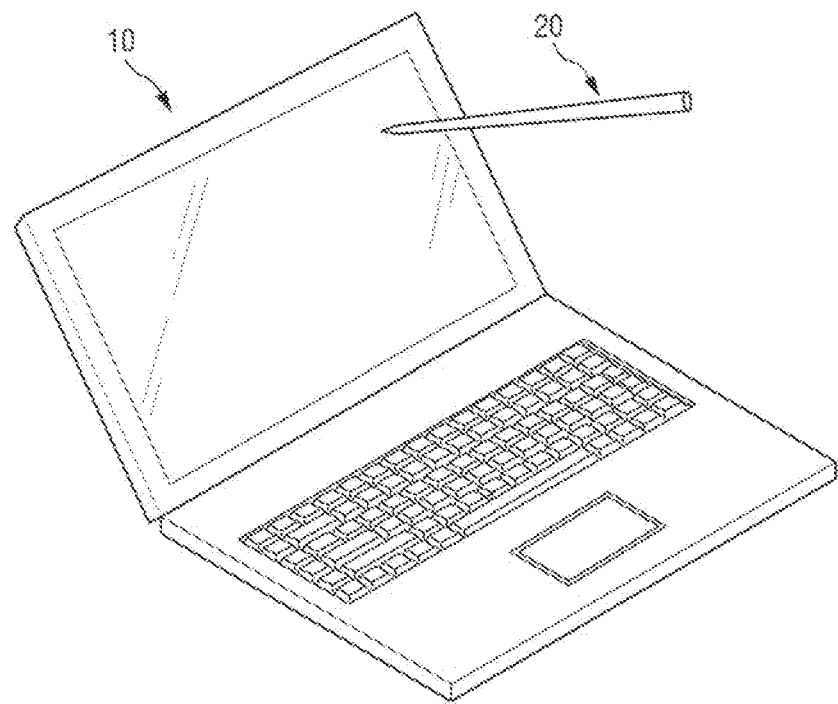

FIGS. 21 and 22 are perspective views illustrating a display device according to an embodiment of the present invention.

Referring to FIGS. 21 and 22, the display device 10 according to an embodiment of the present invention may be applied to a portable electronic device such as a tablet personal computer (PC), a mobile communication terminal, an electronic diary, an electronic book, and a portable multimedia player (PMP). In addition, the display device 10 may be applied to a display unit of a laptop computer, a monitor, a signboard, etc.

In the display device 10 applied to the tablet PC, the mobile communication terminal, the electronic diary, the laptop computer, the monitor, etc. as the display unit, the touch input device 20 may be used as a touch input mechanism. For example, the display device 10 may include a touch sensing unit TSU for sensing a touch of a human body such as a finger, the touch input device 20, etc.

According to a touch input system that includes the touch input device 20 and the display device 10, touch coordinate data of the touch input device 20 may be more accurately generated without complicated computation and correction by using the code patterns CP formed on the display panel 100 of the display device 10, and the touch input of the touch input device 20 may be performed.

For example, in the touch input system according to an embodiment of the present invention, the touch input start point or the entry position of the touch input device 20 may be first identified using the code patterns CP formed at the outer area, that is, the edge area of the display panel 100. Therefore, a non-detection error of a touch position of the edge area may be removed, and a touch input function may be performed by more accurate input coordinates. In addition, power consumption may be reduced, and a driving process may be simplified.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display unit including a plurality of light emission areas;
a plurality of touch electrodes disposed between the plurality of light emission areas to sense a touch; and
a plurality of code patterns formed between the plurality of light emission areas in a predetermined planar code shape, wherein the plurality of code patterns do not vertically overlap the plurality of light emission areas,
wherein code patterns, which indicate preset direction designated position codes, are repeatedly disposed in an outermost area in at least one direction of a touch sensor area in which the plurality of touch electrodes are arranged,
wherein each of the plurality of code patterns covers a portion of the plurality of touch electrodes in the outermost area of the touch sensor area.

2. The display device of claim 1, wherein the plurality of code patterns are formed on a front surface of a portion of the plurality of touch electrodes in a preset area, wherein the plurality of code patterns are formed on a first insulating layer of the touch electrodes in the predetermined planar code shape, or are formed on a transparent film and disposed on a first surface of the touch sensor area together with the transparent film.

3. The display device of claim 1, wherein code patterns, which indicate X-axis direction designated position codes of the touch sensor area, are repeatedly formed in the outermost area in an X-axis direction of the touch sensor area, and
code patterns, which indicate indicating-Y-axis direction designated position codes of the touch sensor area, are repeatedly formed in the outermost area in a-Y-axis direction of the touch sensor area.

4. The display device of claim 3, wherein code patterns, which indicate-X-axis direction designated position codes of the touch sensor area, are repeatedly formed in the outermost area in an-X-axis direction of the touch sensor area, and
code patterns, which indicate Y-axis direction designated position codes of the touch sensor area, are repeatedly formed in the outermost area in a Y-axis direction of the touch sensor area.

5. The display device of claim 3, wherein code patterns, which indicate X-axis or Y-axis position coordinate codes, are repeatedly formed in an outer area adjacent to the outermost area in at least one direction of the touch sensor area.

6. The display device of claim 5, wherein code patterns, which indicate Y-axis position coordinate codes, are repeatedly formed in an outer area in the X-axis direction, which is adjacent to the outermost area in the X-axis direction of the touch sensor area, and
code patterns, which indicate X-axis position coordinate codes, are repeatedly formed in an outer area in the-Y-axis direction, which is adjacent to the outermost area in the-Y-axis direction of the touch sensor area.

7. The display device of claim 6, wherein the code patterns, which indicate the Y-axis position coordinate codes, are repeatedly formed in an outer area in a-X-axis direction, which is adjacent to the outermost area in the-X-axis direction of the touch sensor area, and
the code patterns, which indicate the X-axis position coordinate codes, are repeatedly formed in an outer area in the Y-axis direction, which is adjacent to the outermost area in the Y-axis direction of the touch sensor area.

8. The display device of claim 3, wherein the code patterns, which indicate the directional designated position codes, are repeatedly disposed in the outermost area in at least one direction of the touch sensor area or are disposed in an outer area adjacent to the outermost area in the at least one direction, and
the direction designated position codes are formed with at least four numeric codes including 0 and 3, or 0 and 4.

9. The display device of claim 8, wherein, based on preset vertical and horizontal grid reference lines and crossing point positions between the grid reference lines, the plurality of code patterns are respectively formed at upper, lower, left and right positions of the crossing point positions or at positions corresponding to the crossing point positions.

10. A touch input system comprising:
a display device displaying an image; and
a touch input device inputting a touch to the display device,
wherein the display device includes:
a display unit including a plurality of light emission areas;
a plurality of touch electrodes disposed between the plurality of light emission areas to sense a touch; and
a plurality of code patterns formed between the plurality of light emission areas in a predetermined planar code shape, wherein the plurality of code patterns do not vertically overlap the plurality of light emission areas,
wherein code patterns, which indicate preset direction designated position codes, are repeatedly disposed in an outermost area in at least one direction of a touch sensor area in which the plurality of touch electrodes are arranged, wherein each of the plurality of code patterns covers a portion of the plurality of touch electrodes in the outermost area of the touch sensor area.

11. The touch input system of claim 10, wherein code patterns, which indicate X-axis direction designated position codes of the touch sensor area, are repeatedly formed in the outermost area in an X-axis direction of the touch sensor area, and code patterns, which indicate-Y-axis direction designated position codes of the touch sensor area, are repeatedly formed in the outermost area in a-Y-axis direction of the touch sensor area.

12. The touch input system of claim 11, wherein code patterns, which indicate −X-axis direction designated position codes of the touch sensor area, are repeatedly formed in the outermost area in an −X-axis direction of the touch sensor area, and code patterns, which indicate Y-axis direction designated position codes of the touch sensor area, are repeatedly formed in the outermost area in a Y-axis direction of the touch sensor area.

13. The touch input system of claim 11, wherein code patterns, which indicate −X-axis or Y-axis position coordinate codes, are repeatedly formed in an outer area adjacent to the outermost area in at least one direction of the touch sensor area.

14. The touch input system of claim 13, wherein code patterns, which indicate Y-axis position coordinate codes, are repeatedly formed in an outer area in the X-axis direction, which is adjacent to the outermost area in the X-axis direction of the touch sensor area, and code patterns, which indicate X-axis position coordinate codes, are repeatedly formed in an outer area in the −Y-axis direction, which is adjacent to the outermost area in the −Y-axis direction of the touch sensor area.

15. The touch input system of claim 14, wherein the code patterns, which indicate the Y-axis position coordinate codes, are repeatedly formed in an outer area in a −X-axis direction, which is adjacent to the outermost area in the −X-axis direction of the touch sensor area, and the code patterns, which indicate the X-axis position coordinate codes, are repeatedly formed in an outer area in the Y-axis direction, which is adjacent to the outermost area in the Y-axis direction of the touch sensor area.

16. The touch input system of claim 11, wherein the code patterns, which indicate the direction designated position codes, are repeatedly disposed in the outermost area in at least one direction of the touch sensor area or an outer area adjacent to the outermost area in the at least one direction, and the direction designated position codes are formed with at least four numeric codes including 0 and 3, or 0 and 4.

17. The touch input system of claim 11, wherein, based on preset vertical and horizontal grid reference lines and crossing point positions between the grid reference lines, the plurality of code patterns are respectively formed at upper, lower, left and right positions of the crossing point positions or at positions corresponding to the crossing point positions.

18. The touch input system of claim 17, wherein the touch input device includes:

a code detector detecting code pattern shape data by sensing the plurality of code patterns; and a code processor forming the vertical and horizontal grid reference lines and identifying an arrangement position of the plurality of code patterns based on the crossing point positions of the grid reference lines to extract touch coordinate data.

19. The touch input system of claim 18, wherein the code processor matches the code pattern shape data of a detection area, from which a touch starts at, with the crossing point positions of the grid reference lines, wherein the code processor extracts digital position codes in accordance with the arrangement position of the code patterns with respect to the crossing point positions of the grid reference lines, and wherein the code processor detects touch start and entry direction coordinates for the detection area, from which the touch starts at, by comparing the extracted digital position codes with preset designated position codes.

20. The touch input system of claim 19, wherein the code processor detects X-axis or Y-axis position coordinate codes in accordance with an arrangement position of code patterns, which are most adjacent to the detection area from which the touch starts at, when the digital position codes are extracted, and wherein the code processor generates and outputs position coordinate data of the detection area by combining entry direction coordinates of the detection area with the X-axis or Y-axis position coordinates.

* * * * *